US005781590A

United States Patent [19]
Shiokawa et al.

[11] Patent Number: 5,781,590
[45] Date of Patent: Jul. 14, 1998

[54] PARTIAL RESPONSE MAXIMUM LIKELIHOOD (PRML) SIGNAL PROCESSING APPARATUS

[75] Inventors: Masato Shiokawa; Hiromi Honma, both of Tokyo, Japan

[73] Assignee: NEC Corporation, Tokyo, Japan

[21] Appl. No.: 844,660

[22] Filed: Apr. 21, 1997

[30] Foreign Application Priority Data

Apr. 19, 1996 [JP] Japan .................................. 8-098344

[51] Int. Cl.[6] .................................................. H04L 27/06
[52] U.S. Cl. ............................................ 375/341; 360/39
[58] Field of Search ................................ 375/341, 290, 375/229, 262, 263; 360/39, 46, 48

[56] References Cited

U.S. PATENT DOCUMENTS 5,680,380  10/1997  Taguchi et al. .......................... 369/48

OTHER PUBLICATIONS

Onoe, "Hikari Disuku Gijutsu (Optical Disck Technology)", Radio Gijutsu (Radio Technoloy), pp. 184–185, 1989.
Proceeding of Institute of Television Engineering (ITE), pp. 287–288, 1994.

*Primary Examiner*—Temesghen Ghebretinsae
*Attorney, Agent, or Firm*—Foley & Lardner

[57] ABSTRACT

A PRML (Partial Response Maximum Likelihood) signal processing apparatus for both MP (Mark Position) recorded medium and ME (Mark Edge) recorded medium. The apparatus has a PR (Partial Response) equalizer to which the reproduction signal from the medium is inputted, a folded back value calculation circuit for folding back an input signal thereto with a predetermined level, and a Viterbi detector having a path memory and performing a Viterbi detection. The path memory is constructed based on a structure of a trellis for a signal recorded by the MP recording. In case of the MP recorded medium, the equalizer transfer characteristics and the reference amplitude both for the MP recording are set to the PR equalizer and the Viterbi detector, respectively, and the output of the PR equalizer is directly supplied to the Viterbi detector. On the other hand, in case of the MP recorded medium, the equalizer transfer characteristics and the reference amplitude both for the ME recording are set, and the output of the PR equalizer is supplied to the Viterbi detector via the folded back value calculation circuit.

9 Claims, 19 Drawing Sheets

MP − PR(1, 2, 1), δ = 2

PARTIAL RESPONSE MAXIMUM LIKELIHOOD (PRML) SIGNAL PROCESSING APPARATUS

BACKGROUND OF THE INVENTION

1. Field of the Invention

This invention relates to a signal processing apparatus for use for recording and reproduction of a signal in a magnetic storage apparatus, an optical disk apparatus or a like apparatus, and more particularly to a signal processing apparatus which can perform PRML (Partial Response Maximum Likelihood) signal processing for a reproduction signal by mark position recording and another reproduction signal by mark edge recording using a single Viterbi detector.

2. Description of the Prior Art

Recording types in which an information code is recorded as a recording mark on a recording medium such as an optical disk are roughly divided into mark position (MP) recording and mark edge (ME) recording. The mark position recording is a recording type also called spot recording and is a method wherein binary data {1, 0} are recorded such that each recorded mark position on a disk medium corresponds the digit "1" of a modulation code while any other position corresponds to the digit "0". Meanwhile, the mark edge recording is a method wherein binary data are recorded such that an end of a recorded mark corresponds to "1" of a modulation code while any other position corresponds to "0". The mark position recording is hereinafter referred to simply as MP recording while the mark edge recording is hereinafter referred to simply as ME recording. For example, in Morio Onoe ed., "Hikari Disuku Gijutsu (Optical Disk Technology)", Radio Gijutsu (Radio Technology), 1989, pp. 184–185, an example wherein the MP recording is adopted for a re-writable optical disk system is known and disclosed, and also another example wherein the ME recording is adopted for a read-only optical disk system for digital audio recording are illustrated. Here, the modulation code sequence signifies a code sequence suitable for recording on a recording medium obtained by conversion of an information signal sequence to be written onto the recording medium.

Since an ordinary modulation code sequence for a recording medium does not include a bit sequence which includes two or more successive appearances of the digit "1", marks recorded on a recording medium by the MP recording have a fixed length. Therefore, the MP recording is advantageous in that complicated signal compensation need not be performed before recording of data. Meanwhile, as a problem of the MP recording, it is known that, when marks recorded by the MP recording are reproduced, the amplitude of a reproduction waveform exhibits a large deterioration comparing with that when marks recorded by the ME recording are reproduced. Therefore, where peak detection of a reproduction signal level is performed to regenerate recorded data as in the conventional apparatus, it is difficult to reproduce recorded data, where they are recorded in a high recording density by the MP recording, with a high degree of reliability.

On the other hand, according to the ME recording, generally since the recorded mark length on a medium has a minimum limit position, a larger number of data bits per unit mark length than that by the MP recording can be allocated. Accordingly, the ME recording is more suitable for high density recording than the MP recording. However, the ME recording has a problem in that, since it is influenced strongly by thermal interference or the like upon recording, much pre-recording compensation which is complicated and requires a high cost is required.

In order to achieve data recording of a higher density on a recording medium while the recording types described above are adopted, the technology for reproduction signal processing called PRML (Partial Response Maximum Likelihood) signal processing has been investigated. As described in "Proceeding of Institute of Television Engineering (ITE) "94", pp. 287–288, the PRML signal processing is a technique wherein, even if an inter-code interference amount of a reproduction signal increases by a high recording density or noise added to a reproduction signal increases in the process of recording and reproduction by a head/medium portion of an optical disk drive, such inter-code interference or the noise is removed from a reproduction signal to decrease the error rate of data bits after signal processing. More particularly, the PRML signal processing is a method wherein a signal read out from a recording medium is waveform equalized by a partial response (PR) equalizer and then Viterbi detection is performed to obtain a most likelihood signal sequence to reproduce a recorded modulation code sequence. Further, a data detection method is disclosed in Japanese Patent Laid-Open Application No. Heisei 7-122000 (JP, A, 7-122000) wherein recording onto an optical disk is performed by the ME recording setting the minimum code reversal distance $\delta$ of a modulation code sequence to 2 or more and PRML signal processing which makes use of PR(1,2,1) equalization which will be hereinafter described is performed for a reproduction signal from the optical disk to decrease the error rate in data detection.

FIG. 1 is a block diagram showing a construction of a conventional signal processing apparatus based on PRML signal processing. The signal processing apparatus shown in FIG. 1 performs MP recording and then performs PR(1,2,1) equalization as PR waveform equalization. Further, a recording head and a recording medium are indicated collectively as a head/medium portion 200. Here, the recording medium is an optical disk, on which recorded marks (i.e., recorded pits) are formed by irradiating a laser beam upon the recording medium.

When recording of data onto a recording medium is to be performed, a modulation code sequence E' composed of binary symbols {0, 1} inputted from a modulation code input terminal 141 is inputted to the head/medium portion 200, by which production of recorded marks (recorded pits) on the recording medium is performed. When reproduction of the recorded data is to be performed, the reproduction head reads the recorded pits to produce a reproduction signal G'. Shapes of the recorded pits and variations of signals in the head/medium portion 200 are shown in FIG. 2. FIG. 2 shows signal waveforms at several portions and points when the MP recording is performed using a modulation code sequence E' wherein the minimum code reversal distance $\delta$ is 2 and the PR(1,2,1) equalization is performed upon reproduction. More particularly, the modulation code sequence E' applied to the head/medium portion 200 is shown by (a); an LD driver output for driving a laser diode (LD) in the head/medium portion 200 is shown by (b); recording pits produced on the recording medium are shown by (c); and the reproduction signal G' read out from the recording medium is shown by (d). They are shown in a synchronized condition in the direction of time.

Here, the minimum code reversal distance $\delta$ is a minimum value of the number of appearances of the digit "0" between an appearance and another appearance of the digit "1" in a modulation code sequence, and is an important value which has an influence on the characteristic of the modulation code or the structure of a PRML signal processing apparatus to be applied.

In the case shown in FIG. 2, only when the modulation code sequence E' shown by (a) is "1", the LD driver output exhibits an on-state as seen from (b). As a result, only when the modulation code is "1", a recorded pit is produced on the optical disk medium at the timing shown by (c). The output signal (reproduction signal G') from the reproduction head exhibits, particularly where the recording density is high, a moderate waveform since the resolution is deteriorated by occurrence of inter-code interference as seen from (d), and actually, medium noise is added. Therefore, it is difficult to regenerate the modulation code sequence E' shown by (a) at each point of time correctly from the reproduction signal G' by merely observing the level of the reproduction signal G' at each point of time.

In order to regenerate the modulation code sequence E' shown by (b) of FIG. 2 correctly from the reproduction signal G' shown by (d), the PRML signal processing apparatus includes a reproduction signal processing section 201, to which the reproduction signal G' from the head/medium portion 200 is inputted so that PRML signal processing is performed for the reproduction signal G' by the reproduction signal processing section 201. In the reproduction signal processing section 201, the reproduction signal G' is first equalized by a PR equalizer 142 so that it has a partial response (PR) waveform. In the example shown here, the PR equalizer 142 performs PR(1,2,1) equalization. The PR(1, 2,1) equalization defines a characteristic of a PR equalizer so that a PR equalizer output signal J' corresponding to one appearance of the digit "1" in the modulation code sequence E' exhibits a unit waveform over three signal discrimination times (sampling times), that is, it exhibits the level of 0.5 at the current point of time, the level of 1.0 at the next point of time and the level of 0.5 at the second next point of time. As a result, as seen from (e) of FIG. 2, the PR equalizer output signal J' exhibits, at each signal discrimination time, a value in the proximity of one of the three levels {0, 0.5, 1.0}. Then, if this PR equalizer output signal J' is utilized, then the modulation code sequence E' can be regenerated on the reproduction side with a higher degree of reliability than where the reproduction signal G' shown by (d) is utilized.

In the reproduction signal processing section 201, the PR equalizer output signal J' is subsequently inputted to a Viterbi detector 143. The Viterbi detector 143 converts the PR equalizer output signal J' into a modulation code sequence Z'. The Viterbi detector 143 stores transition patterns of the signal level which appear with the PR(1,2,1) equalization signal at each signal discrimination time in the form of a trellis which will be hereinafter described, and outputs only a binary modulation code sequence corresponding to a transition pattern which should originally appear in the PR(1,2,1) equalization signal. This will be examined with reference to FIG. 2. In particular, in the PR equalizer output signal J' [(e) of FIG. 2], for example, only the level of 0.5 is produced at a time adjacent any time at which the level of 1.0 is produced, and the level of 0 and the level of 1.0 are not produced at adjacent times to each other at all. Accordingly, even if a wrong signal level transition which does not conform with the signal level transition rule just described is observed in the input to the Viterbi detector 143 because of noise superposed in the head/medium portion 200, the Viterbi detector 143 selects a transition pattern nearest to the wrong signal level transition from within correct transition patterns of the output signal level of the PR(1,2,1) equalizer and outputs the selected transition pattern as a Viterbi detector output signal Z' from an output terminal 144 as seen from (f) of FIG. 2. By this operation of the Viterbi detector 143, the bit error rate of the Viterbi detector output sequence shown by (f) of FIG. 2 is reduced further than the bit error rate of the modulation code sequence J' obtained by peak detection of the output of the PR equalizer shown by (e) of FIG. 2.

FIG. 3 shows an example of construction of the conventional PR equalizer 142 which is used in the conventional PRML signal processing apparatus described above. Each of delay elements 31 provides a delay of one unit time (T) to a signal which passes therethrough. A plurality of such delay elements 31 are connected in series, and an equalizer input signal (reproduction signal) G' inputted from a PR equalizer input terminal 161 passes the train of delay elements 31, whereupon N tap output signals i(N), i(N-1), . . . , i(1) having the delay time difference T from each other are obtained. The tap output signals are multiplied by tap coefficients C1', C2', . . . , CN' by respective multipliers 32, and multiplication results of them are outputted to an adder 33. The sum i(N)C1'+i(N-1)C2'+ . . . +i(1)CN' of the multiplication results is outputted as an equalizer output signal J' from the adder 33 to an equalizer output terminal 162. The PR(1,2,1) equalizer is realized by setting the tap coefficients C1', C2', . . . , CN' to values obtained from characteristics of a reproduction signal and employment of a PR(1,2,1) equalization waveform for the PR equalizer output signal.

Next, the Viterbi detector 143 which is used by the conventional PRML signal processing apparatus described above will be described. FIG. 4 is a block diagram showing a construction of the Viterbi detector 143 used for a signal obtained by PR(1,2,1) equalization of a reproduction signal from a modulation code sequence recorded by the MP recording. The Viterbi detector 143 shown includes a branch metric calculation circuit 174 which receives as an input thereto a PR equalizer output signal J' inputted to a Viterbi detector input terminal 171 and calculates branch metrics B1', B2' and B3', an ACS (Add, Compare and Select) circuit 172 for outputting a path memory control signal (detection sequence switch control signal) h' based on the branch metrics B1', B2' and B3', and a path memory 173 which is controlled by the path memory control signal h'. An output terminal of the path memory 173 serves as the output terminal 144 of the Viterbi detector.

The branch metric calculation circuit 174 includes three subtractors 48 and three square operators 49 and inputs the PR equalizer output signal J' commonly to the subtractors 48. The subtractors 48 calculate 0-J', 0.5 J' and 1.0-J' from the PR equalizer output signal J' and equalization aimed values {0, 0.5, 1.0} for the PR equalizer set in the Viterbi detector in advance, respectively, and output those calculation results independently of each other to corresponding ones of the square operators 49. The square operators 49 calculate, for each point of time, square values of the input signals thereto:

$$B1'=(0-J')^2, B2'=(0.5-J')^2,$$
$$B3'=(1.0-J')^2 \quad (1)$$

and output the thus calculated square values to the ACS circuit 172. The values B1', B2' and B3' are called branch metrics of the Viterbi detector at each point of time and are values representing the degrees of nearness of signals after the PR(1,2,1) equalization to ideal PR(1,2,1) equalization signals.

The ACS circuit 172 holds in the inside thereof values P(1), P(2) and P(3) called path metrics. The path metrics P(1), P(2) and P(3) are initialized so that $$P(1)=P(2)=P(3)=0 \qquad (2)$$

may be satisfied before a reproduction operation is performed. Then, upon a reproduction operation, the ACS circuit 172 compares, based on the branch metrics B1', B2' and B3' calculated in accordance with equation (1) and inputted thereto, at each point of time, from P(1) to P(3) obtained at previous point of time and B1, B2' and B3' obtained at the current point of time, P(1)+B2' and P(3)+B1' with each other and determines the value of the control signal h' so that it satisfies if $P(1)+B2' \geq P(3)+B1'$, then h'=0, if $P(1)+B2' < P(3)+B1'$, then h'=1 $\qquad (3)$ Then, the ACS circuit 172 outputs the thus determined value of the control signal h' to the path memory 173, and then updates the values of the path metrics P(1), P(2) and P(3) in accordance with $$P(1)=P(2)+B3',$$

$$P(2)=P(3)+B2',$$

$$P(3)=\min\{P(1)+B2', P(3)+B1'\} \qquad (4)$$

where $\min\{\alpha, \beta\}$ is an operator which signifies a lower value between $\alpha$ and $\beta$.

Here, details of an example of construction and operation of the path memory 173 will be described with reference to FIGS. 5, 6A, 6B and 7. FIG. 5 is a block diagram showing a construction of a path memory of a Viterbi detector used for a signal after MP recording-PR(1,2,1) equalization. FIGS. 6A and, 6B are diagrammatic views illustrating connections between input terminals and output terminals of a detection sequence switches in the path memory, and connections where h'=0 are shown in FIG. 6A while connections where h'=1 are shown in FIG. 6B.

In the views which show detection sequence switches and connections of them, where an input terminal and an output terminal of the detection sequence switch is disconnected, the path is indicated by a broken line.

As shown in FIG. 5, the path memory 173 includes n detection sequence switches $64_1$ to $64_n$ and 3(n-1) delay elements $65^1$ to $65^{n-1}$. Each delay element consists of, for example, a flip flop (FF) circuit. Every three delay elements $65^1$ to $65^{n-1}$ constitute respective sets and the sets of the three delay elements are interposed between individual adjacent ones of the detection sequence switches $64_1$ to $64^n$. Each of the delay elements $65_1$ to $65^{n-1}$ outputs an input thereto after delaying it by one unit time. The path memory control signal h' is inputted to the detection sequence switches $64_1$ to $64_n$ via a common path memory control signal input terminal 66.

It is assumed that, when the path memory control signal h' is h'=0 and 1 in FIG. 5, the connections of input and output terminals of all of the detection sequence switches $64_1$ to $64_n$ are such as shown in FIGS. 6A and 6B, respectively. Then, all values of the delay elements $65_1$ to $65_{n-1}$ connected to the output terminals of the detection sequence switches $64_1$ to $64_{n-1}$ except the last stage are shifted in the rightward direction toward the respective next delay elements via the respective detection sequence switches. Simultaneously, candidates for Viterbi detector output sequence digit, that is, V1=0, V2=1 and V3=0, are inputted to the input terminals X1, X2 and X3 of the first detection sequence switch $64_1$, and the input digits are inputted to the three delay elements $65_1$ via the detection sequence switch $64_1$ and the output terminals Y1, Y2 and Y3 of the detection sequence switch $64_1$. Consequently, a Viterbi detector output Z' for one point of time is outputted from a Viterbi detector output terminal 15. Here, if it is assumed that the connection condition of each of the detection sequence switches $64_1$ to $64_n$ is h'=0 shown in FIG. 6A, then the values V2=1, V3=0 and V3=0 inputted from the input terminals X2, X3 and X3 reach the output terminals Y1, Y2 and Y3, respectively, but V1=0 does not reach any output terminals of the detection sequence switches $64_1$ to $64_n$. By performing the procedure described above for each point of time, a Viterbi detector output sequence Z' composed of binary symbols {0, 1} is obtained from the Viterbi detector output terminal 15. While, in the example shown in FIG. 5, only the output terminal Y1 of the detection sequence switch $64_n$ n at the last stage is connected to the Viterbi detector output terminal 15, if the number n of detection sequence switches is sufficiently high as several tens or more, then the sequences outputted from the output terminals Y1, Y2 and Y3 of the detection sequence switch $64_n$ at the last stage become equal to each other.

The method of determination of the path memory control signal h' given by equation (3), the method of determination of branch metrics given by equation (1), the updating procedure for path metrics given by equation (4) and the connection method between the input and output terminals of the detection sequence switches $64_1$ to $64_n$ shown in FIGS. 6A and 6B are all determined based on a trellis for the MP recording-PR(1,2,1) illustrated in FIG. 7. The trellis shown in FIG. 7 represents a transition rule for the level of a signal (PR equalizer output signal J' of FIG. 1) obtained by PR(1,2,1) equalization of a reproduction signal reproduced from a modulation signal, wherein the minimum code reversal distance $\delta$ is 2, recorded by the MP recording when noise is not added to the signal. Referring to FIG. 7, in [output bit/reference amplitude] applied to each of branches 81 to 84 from states at time t1 to states at time t, the output bits define V1, V2 and V3 in FIG. 5, and the reference amplitudes define the values 0, 0.5 and 1.0 in the branch metric calculation circuit 174 of FIG. 4. Further, each square in FIG. 7 represents a state of the trellis, and the connections of the branches 81 to 84 interconnecting different states define a connection rule in the detection sequence switches $64_1$ to $64_n$ of FIG. 5.

An example of a construction of a conventional apparatus wherein a signal recorded by the MP recording is reproduced and PRML signal processing is performed for the reproduced signal is described above. In the following, an example of a construction of another conventional example wherein a signal recorded by the ME recording and PRML signal processing is performed for the reproduced signal will be described with reference to FIGS. 8, 9, 10, 11, 12A, 12B, 12C and 12D.

FIG. 8 is a block diagram showing a construction of a conventional PRML signal processing apparatus which effects ME recording-PR(1,2,1) equalization Viterbi detection. A modulation code sequence E" is inputted, before it is recorded onto a recording medium, to an NRZI (Non Return to Zero Inversion) circuit 7, in which conversion of the sequence is performed by a delay element 6 and an exclusive OR calculation circuit 5 so that it is supplied as an NRZI output signal F" to a head/medium portion 200. In the NRZI output signal F", each appearance of the digit "1" in the modulation code sequence E" corresponds to a rising edge or a falling edge of the level. FIG. 9 shows signal waveforms at several portions and points when the ME recording is performed using a modulation code sequence E" wherein the minimum code reversal distance $\delta$ is 2 and the PR(1,2,1)

equalization is performed upon reproduction. In particular, the modulation code sequence E" supplied to the head/medium portion 200 is shown by (g); the NRZI output signal F" is shown by (h); an LD driver output for driving a laser diode (LD) in the head/medium portion 200 is shown by (i); recorded pits (recorded marks) produced on a recording medium are shown by (j); and a reproduction signal G" read out from the recording medium is shown by (k). Those signals are shown in a synchronized relationship in the direction of time.

As seen from (i) of FIG. 9, since the LD driver output exhibits an on-state when the output sequence F" of the NRZI circuit shown by (h) is "1" similarly to the LD driver used upon the MP recording, it is considered that the difference between the ME recording and the MP recording of an input signal to the head/medium portion 200 resides whether or not the NRZI circuit 7 is involved. Referring to FIG. 8, the reproduction signal G" is subsequently inputted to a PR(1,2,1) equalizer 152, by which the PR(1,2,1) equalization of the reproduction signal is performed similarly as in the PR(1,2,1) equalizer 142 of FIG. 1 described hereinabove. Then, an output signal J" of the PR equalizer 152 is inputted to a Viterbi detector 153, and a Viterbi detector output signal Z" is obtained from a Viterbi detector output terminal 154. The PR equalizer 152 and the Viterbi detector 153 construct a reproduction signal processing section 202.

FIG. 10 is a block diagram showing a construction of the Viterbi detector 153, that is, a Viterbi detector which is used where a modulation signal wherein the minimum code reversal distance δ is 2 is ME recorded and a reproduction signal of it is PR(1,2,1) equalized. The Viterbi detector shown includes, similarly to the Viterbi detector for the MP recording shown in FIG. 4, a Viterbi detector input terminal 181 to which a PR equalizer output signal J" is inputted, a branch metric calculation circuit 184, an ACS circuit 182, a path memory 183, and a Viterbi detector output terminal 154. As shown in FIG. 10, the branch metric calculation circuit 184 includes four subtractors 48 and four square operators 49, and calculates squares of differences between the PR equalizer output signal J" and four reference amplitudes $\{0, 0.25, 0.75, 1.0\}$ and outputs them as branch metrics B1" to B4" to the path memory 183. The branch metrics B1" to B4" are calculated, similarly to the calculation of the branch metrics B1" to B3' of the Viterbi detector of FIG. 4 described hereinabove, by $$B1"=(0-J")^2, B2"=(0.25-J")^2,$$
$$B3"=(0.5-J")^2, B4"=(0.75-J")^2 \quad (5)$$

Similarly to the operation according to equations (3) and (4) of the ACS circuit 172 of the Viterbi detector of FIG. 4, the ACS circuit 182 here executes, as initialization, $$P(1)=P(2)=P(3)=P(4)=0 \quad (6)$$

On the other hand, upon a reproduction operation, the ACS circuit 182 performs comparison between P(1)+B4" and P(3)+B3" and comparison between P(2)+B2" and P(4)+B1", and determines and outputs values of control signals h1" and h2" so that if P(1)+B4"<P(3)+B3", then h1"=0, if P(1)+B4"≧P(3)+B3", then h1"=1, if P(2)+B2"<P(4)+B1", then h2"=0, if P(2)+B2"≧P(4)+B1", then h2"=1 (7)

may be satisfied. Further, the ACS circuit 182 operates in accordance with $$P(1)=\min\{P(1)+B4", P(3)+B3"\},$$
$$P(2)=P(1)+B3",$$
$$P(3)=P(4)+B2",$$
$$P(4)=\min\{P(2)+B2", P(4)+B1"\} \quad (8)$$

to update the path metrics.

FIG. 11 shows a construction of the path memory 183. The path memory 183 shown includes n detection sequence switches $191_1$ to $191_n$ and 4(n-1) delay elements $192_1$ to $192_{n-1}$. Every four delay elements $192_1$ to $192_{n-1}$ constitute respective sets and the sets of four delay elements are interposed between adjacent ones of the detection sequence switches $191_1$ to $191_n$. Each of the delay elements $192_1$ to $192_{n-1}$ outputs an input thereto after delaying it by one unit time.

A pair of path memory control signals h1" and h2" are inputted to the detection sequence switches $191_1$ to $191_n$ via a pair of common path memory control signal input terminals 193. In the path memory, at each point of time at which one bit is to be processed, input terminals and output terminals of each of the detection sequence switches $191_1$ to $191_n$ are connected to each other in one of such connections as shown in FIGS. 12A, 12B, 12C and 12D depending upon whether the values of the path memory control signals are (h1", h2")=(0, 0), (1, 0), (0, 1) or (1, 1). In FIG. 11, the connections when (h1", h2")=(0, 0) are shown. Then, all of values of the delay elements $192_1$ to $192_{n-1}$ connected to the output terminals of the detection sequence switches $191_1$ to $192_{n-1}$ except the last stage are shifted in the rightward direction toward the next delay elements via respective detection sequence switches. Simultaneously, V1=0, V2=1, V3=1 and V4=0 which are candidates for Viterbi detection output sequence digit are inputted from the input terminals X1 to X4, respectively. Consequently, a Viterbi detector output signal Z" for one point of time is outputted from a Viterbi detector output terminal 194, and the input bits V1 to V4 are inputted to the four delay elements $192_1$ via the detection sequence switch $191_1$ and the output terminals Y1, Y2, Y3 and Y4 of the detection sequence switch $191_1$, respectively. By performing the procedure described above at each point of time, a Viterbi detector output signal Z" composed of binary symbols $\{0, 1\}$ is obtained.

The method of determination of the path memory control signals h1" and h2" given by equation (7), the method of determination of branch metrics given by equation (5), the updating procedure for path metrics given by equation (8) and the connection method between the input and output terminals of the detection sequence switches shown in FIGS. 12A, 12B, 12C and 12D are all determined based on a trellis for the ME recording-PR(1,2,1) illustrated in FIG. 13. The trellis of FIG. 13 represents a transition rule for the level of a signal obtained by PR(1,2,1) equalization of a reproduction signal reproduced from a modulation signal, wherein the minimum code reversal distance δ is 2, recorded by the ME recording when no noise is added to the signal by branches 85 to 89.

Here, a case wherein two different kinds of disk media including an MP recorded disk medium and an ME recorded disk media are available and it is tried to perform recording on the media and then perform PRML signal processing to reproduce the recorded data is considered. The conventional signal processing techniques described above have a problem in that such two kinds of recording media as described above cannot be processed only by a single PRML signal processing apparatus and two kinds of apparatus of a PRML signal processing apparatus for the MP and another PRML signal processing apparatus for the ME must be prepared.

The reason why this problem is involved is that the construction of the Viterbi detector for the MP recording-PR(1,2,1) equalization shown in FIG. 4 and the construction of the Viterbi detector for the ME recording-PR(1,2,1) equalization shown in FIG. 10 are different from each other. Both of the Viterbi detectors are applied to a modulation code wherein the minimum code reversal distance δ is 2. Taking notice of the branch metric calculation circuits 174 and 184 of the Viterbi detector shown in FIG. 4 and the Viterbi detector shown in FIG. 10, respectively, the numbers of the subtractors 48 and the square operators 49 included in the branch metric calculation circuits 174 and 184 are different from each other, and also the reference amplitudes for the Viterbi detectors inputted to the (+) side terminals of the subtractors 48 have different values.

Further, the situations of the connections between the input and output terminals of the detection sequence switches $64_1$ to $64_n$ and $191_1$ to $191_n$, the detection sequence switch control signals (path memory control signals) and the numbers of the delay elements $65_1$ to $65_{n-1}$ and $192_1$ to $192_{n-1}$ are different between the path memory in the Viterbi detector for the MP recording-PR(1,2,1) equalization shown in FIG. 5 and the path memory in the Viterbi detector for the ME recording-PR(1,2,1) equalization shown in FIG. 11. Further, while the connection patterns shown in FIGS. 6A and 6B and the connection patterns shown in FIGS. 12A, 12B, 12C and 12D represent switching rules for the detection sequence switches $64_1$ to $64_n$ shown in FIG. 5 and the detection sequence switches $191_1$ to $191_n$ shown in FIG. 11, respectively, the rules are different from each other.

The reason why the Viterbi detector for the MP recording and the Viterbi detector for the ME recording are different from each other in this manner resides in the structures of the trellises which define operations of the Viterbi detectors. While FIG. 7 and FIG. 13 show trellises when the MP recording-PR(1,2,1) equalization and the ME recording-PR (1,2,1) equalization are performed, respectively, where a modulation code wherein the minimum code reversal distance δ is 2 is used as described above, the trellises are different in number of states and connection condition of branches from each other. It is impossible to realize PRML signal processing for the MP recording and PRML signal processing for the ME recording with a single PRML processing apparatus unless the structure of the trellis is the same between the MP recording and the ME recording.

SUMMARY IF THE INVENTION

It is an object of the present invention to provide an apparatus which can record a signal on both of a disk medium for MP recording and another disk medium for ME recording and provide an apparatus which can perform PRML signal processing for reproduction signals of the two kinds of disk media with a smaller apparatus scale than ever.

It is another object of the present invention to provide an apparatus wherein PRML signal processing can be performed for reproduction signals of two kinds of disk media using a single circuit operation procedure.

The objects of the present invention are achieved by a signal processing apparatus which performs PRML (Partial Response Maximum Likelihood) signal processing for a reproduction signal from a recording medium, comprising an equalizer to which the reproduction signal is inputted and which equalizes the reproduction signal with equalizer transfer characteristics, the equalizer transfer characteristics being settable; a first memory storing the equalizer transfer characteristics for MP (mark position) recording; a second memory storing the equalizer transfer characteristics for ME (mark edge) recording; a folded back value calculation circuit for folding back an input signal thereto with reference to a predetermined level to output a folded back calculation circuit output signal corresponding to an absolute value of a difference between the predetermined level and the input signal; a Viterbi detector having a path memory and performing a Viterbi detection with reference amplitudes, the reference amplitude being settable; a third memory storing the reference amplitudes for the MP recording; and a fourth memory storing the reference amplitudes for the ME recording; the path memory being constructed based on a structure of a trellis for a signal recorded by the MP recording; wherein when the reproduction signal based on the MP recording is reproduced, the equalizer transfer characteristics for the MP recording are set to the equalizer, the reference amplitude for the MP recording are set to the Viterbi detector, and the output of the equalizer is directly supplied to the Viterbi detector, and when the reproduction signal based on the ME recording is reproduced, the equalizer transfer characteristics for the ME recording are set to the equalizer, the reference amplitude for the ME recording are set to the Viterbi detector, and the output of the equalizer is supplied to the Viterbi detector via the folded back value calculation circuit.

The objects of the present invention are also achieved by a signal processing apparatus which performs PRML signal processing for a reproduction signal from a recording medium, comprising an equalizer to which the reproduction signal is inputted and to equalize the reproduction signal with equalizer transfer characteristics; transfer characteristic storage means for storing the equalizer transfer characteristics individually for MP recording and ME recording; first selection means for selecting the equalizer transfer characteristics from the transfer characteristic storage means depending upon whether the recording type on the recording medium is the MP recording or the ME recording and setting the selected equalizer transfer characteristics to the equalizer; a folded back value calculation circuit for folding back an input signal thereto with reference to a predetermined level to output a folded back calculation circuit output signal corresponding to an absolute value of a difference between the predetermined level and the input signal; a Viterbi detector having a path memory and performing a Viterbi detection with reference amplitudes; reference amplitude storage means for storing the reference amplitudes for the MP recording and the ME recording; second selection means for selecting the reference amplitudes from the reference amplitude storage means depending upon whether the recording type on the recording medium is the MP recording or the ME recording and setting the selected reference amplitudes to the Viterbi detector; and third selection means for inputting, when the recording type on the recording medium is the MP recording, an output of the equalizer to the Viterbi detector, but inputting, when the recording type on the recording medium is the ME recording, the output of the equalizer to the Viterbi detector via the folded back value calculation circuit; the path memory being constructed based on a structure of a trellis for a signal recorded by the MP recording, the path memory being used upon reproduction of a recorded signal irrespective of whether the recorded signal is a signal recorded by the MP recording or a signal recorded by the ME recording.

Preferably, the signal processing apparatus of the present invention further comprises a recording signal processing section for producing a signal corresponding to a recorded mark train to be formed on the recording medium in response to a modulation code sequence, the recording signal processing section including an NRZI circuit for performing NRZI conversion for an input signal thereto, and fourth selection means for using, when the MP recording onto the recording medium is to be performed, the modulation code sequence as it is as a signal corresponding to the recording mark train, but using, when the ME recording onto the recording medium is to be performed, a signal obtained by inputting the modulation code sequence to the NRZI circuit as a signal corresponding to the recording mark train. By providing such a recording signal processing section, it is possible to perform both the MP recording and the ME recording on recording media such as optical disk media by using a single recording signal processing circuit.

According to the present invention, where the structure of a trellis used upon reproduction of an MP recorded signal is the same as the structure of a trellis degenerated from a trellis used upon reproduction of an ME recorded signal, a path memory of a Viterbi detector is constructed based on the trellis upon reproduction of an MP recorded signal, and this Viterbi detector is used for both of the MP recording and the ME recording. In order to effect, for the ME recording, Viterbi detection based on the degeneracy trellis, in the present invention, the equalizer output signal is inputted, for the ME recording, to the Viterbi detector after passing it through the folded back value calculation circuit. In the present invention, a PR (partial response) equalizer is typically used for the equalizer. And, equalizer transfer functions of the PR equalizer such as tap coefficients are stored in the transfer function storage means such as a tap coefficient memory in advance for each of the MP recording and the ME recording, and are supplied to the equalizer in response to the recording type of the MP recording or the ME recording. Also where an adaptive equalizer is used, the transfer function storage means is referred to in order to set initial values.

Further, the reference amplitudes of the Viterbi detector are stored in the reference amplitude storage means such as a reference amplitude memory in advance for each of the MP recording and the ME recording, and are supplied to the Viterbi detector in response to the recording type of the MP recording or the ME recording. Where the number of reference amplitudes in the Viterbi detector necessary to Viterbi detect a signal obtained by equalization of a reproduction signal from the medium is different between the MP recording and the ME recording, the number of storage units of the reference amplitude memory equal to the number of reference amplitudes of that one of the recording types which requires a larger number of reference amplitudes should be prepared.

In the following, the principle of the present invention will be described.

FIG. 7 shows, as described hereinabove, a trellis of a Viterbi detector for the PR(1.2.1) equalization upon reproduction of an MP recorded signal which is used with a modulation code wherein the minimum code reversal distance δ is 2, and FIG. 14 shows a trellis of a conventional Viterbi detector for the PR(1,2,2,1) equalization upon reproduction of an ME recorded signal used with the modulation code. It is tried to fold back the trellis shown in FIG. 14 along an alternate long and short dash line W–W' so that states S1, S2 and S3 at each point of time may be placed on states S6, S5 and S4, respectively. By this operation, branches 101, 102, 103 and 104 are placed on branches 108, 107, 106 and 105, respectively. Further, it can be seen that, by the operation, those branches whose output bits are equal are placed one on the other, and where x>0, with regard to the reference amplitude, 0.5−x are placed on 0.5+x with reference to the level 0.5. Thus, as described above, when the reference amplitude for a certain branch of the conventional trellis is 0.5−x, 0.5+x is designated for the reference amplitude of a branch which coincides with the certain branch after the trellis is folded back along W–W'. A trellis of the state number of 3, the branch number of 4 and the reference amplitude of 4 formed by this procedure is shown in FIG. 15. The relationship between the trellis shown in FIG. 14 and the trellis shown in FIG. 15 is that, as regards the state, S1 and S6 of FIG. 14 correspond to S3 of FIG. 15, S2 and S5 of FIG. 14 correspond to S2 of FIG. 15, and S3 and S4 of FIG. 14 correspond to S1 of FIG. 15. As regards the branch, the branch 101 and the branch 108 of FIG. 14 correspond to the branch 94 of FIG. 15, the branch 102 and the branch 107 of FIG. 14 correspond to the branch 93 of FIG. 15, the branch 103 and the branch 106 of FIG. 14 correspond to the branch 92 of FIG. 15, and the branch 104 and the branch 105 of FIG. 14 correspond to the branch 91 of FIG. 15. The variation of the construction of the trellis from FIG. 14 to FIG. 15 by the method described above is called degeneracy, and the trellis of FIG. 15 is defined as a degeneracy trellis from the trellis of FIG. 14.

The data error rate characteristic of an output sequence of a Viterbi detector constructed based on the degeneracy trellis (shown in FIG. 15) from the trellis of the PR(1,2,2,1) equalization of a modulation code wherein the minimum code reversal distance δ is 2 is substantially equal to the data error rate of an output sequence of another Viterbi detector constructed based on the trellis (shown in FIG. 14) before the degeneracy. The foundation will be described with reference to FIGS. 16, 17 and 18. FIG. 16 illustrates a combination of paths which provide a minimum free distance in the degeneracy trellis shown in FIG. 15, and FIG. 17 illustrates a combination of paths which provide a minimum free distance in a conventional 6-state trellis for the PR(1,2,2,1) equalization for an ME recorded signal.

It is assumed that, in the conventional trellis shown in FIG. 17, although a path represented as "correct path" in FIG. 17 and taking the reference amplitudes of 0.167, 0.5, 0.833 and 1.0, that is, a path which passes the states S6, S5, S4, S1 and S1, must have been selected in a situation wherein no noise is involved, another path formed from an aggregate of branches having different wrong reference amplitudes is selected because some noise is applied in a recording or reproduction process. In this instance, one of paths which may be selected with the highest probability next to the correct path is the path represented as "wrong path" in FIG. 17 and taking the reference amplitudes of 0, 0.167, 0.5 and 0.833, that is, the path which passes the states S6, S6, S5, S4 and S1. If this wrong path is selected, than as can be seen from comparison between the columns for output bits of the correct path and the wrong path of FIG. 17, the output bits of the Viterbi detector corresponding to this path section include an error of 2 bits. Then, the error likelihood from the correct path to the wrong path is given by a maximum free distance, that is, by the sum of squares of differences between reference amplitudes of branches which form the correct path and the wrong path at each point of time. The minimum free distance in the conventional trellis of FIG. 17 is $(0.67-0)^2+(0.5-0.133)^2+(0.833-0.5)^2+(1.0-0.833)^2=0.278$. Meanwhile, if a similar calculation is performed also for the degeneracy trellis of FIG. 16, also the minimum free distance between the correct path and the wrong path is 0.278. This signifies that, whether a Viterbi detector is constructed based on the degeneracy trellis shown in FIG. 16 or based on the conventional trellis shown in FIG. 17, the bit error rates of output sequences of the Viterbi detectors are substantially equal to each other.

FIG. 18 illustrate relationships between the noise amount (SN ratio; signal to noise ratio) and the bit error rate of a Viterbi detector output sequence in a recording and reproduction process obtained using Viterbi detectors constructed based on the trellises shown in FIGS. 16 and 17. As can be seen from FIG. 18, even where the trellis of FIG. 16 degenerated from the trellis of FIG. 17 is used, the bit error rate after PRML signal processing is performed is substantially equal to that where the trellis before the degeneracy is used.

The structure of a degeneracy trellis from the trellis for the PR(1,2,2,1) upon reproduction of an ME recorded signal shown in FIG. 15, that is, the state number and the connection condition of branches between the states, is the same as the structure of the trellis for the PR(1,2,1) upon reproduction of an MP recorded signal of FIG. 7. Making use of this characteristic of the structures of the trellises, it is possible to construct, upon reproduction of an MP recorded signal, a Viterbi detector for the PR(1,2,1) equalization based on the trellis of FIG. 7 and construct, upon reproduction of an ME recorded signal, a Viterbi detector for the PR(1,2,2,1) equalization based on the trellis shown in FIG. 15. However, to this end, since the conventional trellis shown in FIG. 14 is folded back with respect to the reference amplitude of 0.5 in the process wherein the conventional trellis is folded back to produce the degeneracy trellis shown in FIG. 15, it is necessary to perform, upon reproduction of an ME recorded signal, signal conversion corresponding to the folding back with respect to the reference amplitude for PR equalizer output signals and then input the resulting PR equalizer output signals to the Viterbi detector. Further, while the reference amplitudes in the trellis for the MP recording shown in FIG. 15 are {0, 0.5, 1.0}, the reference amplitudes in the degeneracy trellis for the ME recording shown in FIG. 15 are {0.5, 0.833, 1.0}. Therefore, values of the reference values suitable for each of the recording types of the MP recording and the ME recording are prepared, and when a recorded signal is to be reproduced, the reference amplitude values are changed over depending upon whether the recorded signal is recorded by the MP recording or the ME recording.

If a Viterbi detector, signal folding back means (folded back value outputting circuit) for folding back ME recorded signal-PR(1,2,1) equalizer output signals with respect to the signal level of 0.5 and reference value change-over means (selection means), which are constructed making use of the fact that the trellis for an MP recorded signal-PR(1,2,1) equalizer and the degeneracy trellis from the trellis for an ME recorded signal-PR(1,2,2,1) equalizer have the same structure, are used, then PRML signal processing can be performed upon reproduction of both of recorded signals recorded by the MP recording and the ME recording only by using a single Viterbi detector.

While the argument is given above regarding a trellis used for a modulation code wherein the minimum code reversal distance δ is 2, an example wherein, even if a trellis for the ME recording for use with a modulation code wherein the minimum code reversal distance δ is 1 is degenerated, the bit error rate of a Viterbi detector sequence is equal to that before the degeneracy is described below. FIG. 19 shows a trellis of a Viterbi detector for use with a PR(1,2,2,1) equalizer upon reproduction of an ME recorded signal using a modulation code wherein the minimum code reversal distance δ is 1. If the trellis is folded back along an alternate long and short dash line W-W' similarly to the trellis for a modulation code wherein the minimum code reversal distance δ is 2 described above, then a degeneracy trellis shown in FIG. 20 is obtained. Meanwhile, FIG. 21 illustrates a trellis for signals obtained by PR(1,2,1) equalization of an MP recorded modulation code sequence wherein the minimum code reversal distance δ is 1. The degeneracy trellis for the ME recording shown in FIG. 20 and the trellis for the MP recording shown in FIG. 21 have the same structure. Consequently, by using the degeneracy trellis of FIG. 20 for the ME recording, PRML signal processing of a reproduction signal from an ME recorded medium and another reproduction signal from an MP recorded medium can be performed using the same Viterbi detector. Further, the minimum free distance of the degeneracy trellis of FIG. 20 is 0.27 equal to the minimum free distance of the conventional trellis shown in FIG. 19. Therefore, if a Viterbi detector based on the degeneracy trellis shown in FIG. 20 is used upon reproduction of an ME recorded signal, then a substantially equal bit error rate characteristic to that obtained where a Viterbi detector based on the conventional trellis shown in FIG. 19 is used is obtained.

The above and other objects, features, and advantages of the present invention will become apparent from the following description with references to the accompanying drawings which illustrate an example of the present invention.

DESCRIPTION OF THE PREFERRED EMBODIMENTS

Figure 22:
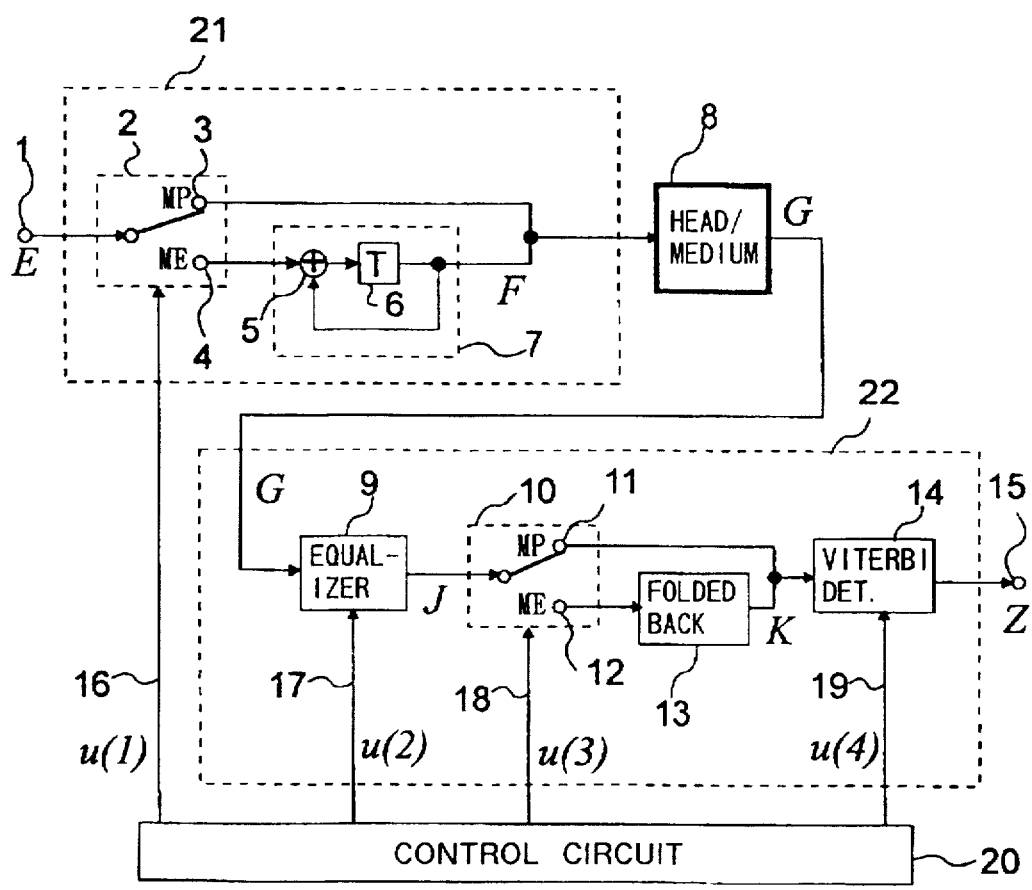
FIG. 22 is a block diagram showing a construction of a signal processing apparatus of an embodiment of the present invention.

A signal processing apparatus of an embodiment of the present invention shown in FIG. 22 performs recording by MP recording or ME recording based on a modulation code sequence E onto a head/medium portion 8 formed from a recording/reproduction head and a recording medium, and performs PRML signal processing for a reproduction signal G from the head/medium portion 8 to obtain a Viterbi detector output signal Z corresponding to the modulation code sequence E. An optical disk medium is used as the recording medium, for example. The signal processing apparatus is roughly composed of a recording signal processing section 21 for performing recording onto the head/medium portion 8 based on a modulation code sequence E inputted to a modulation code input terminal 1, a reproduction signal processing section 22 for performing PRML signal processing for the reproduction signal G and outputting a Viterbi detector output signal Z from a Viterbi detector output terminal 15, and a control circuit 20 for controlling the recording signal processing section 21 and the reproduction signal processing section 22.

Here, description is given under the assumption that the minimum code reversal distance δ of the modulation code sequence E which is data to be recorded onto a disk medium is 2. The code sequence wherein the minimum code reversal distance δ is 2 may be an EFM code, a 2-7 code or the like.

The recording signal processing section 21 includes a signal switch 2 for switching between the MP recording and the ME recording, and an NRZI circuit 7 for producing an NRZI circuit output sequence F for the ME recording from a modulation code sequence E. A modulation code sequence E inputted from the modulation code input terminal 1 to the recording signal processing section 21 is, when the MP recording onto a disk medium is to be performed, connected to an MP contact 3 by the signal switch 2 in the recording signal processing section 21 so that the modulation code sequence E is outputted as it is to the head/medium portion 8 without passing the NRZI conversion circuit 7. On the other hand, when the ME recording onto a disk medium is to be performed, connection to an ME contact 4 is performed by the signal switch 2, and the modulation code sequence E passes through the NRZI circuit 7 to make an NRZI circuit output sequence F, which is outputted to the head/medium portion 8. The NRZI circuit 7 includes a delay element 6 for providing a delay of one unit time, and an exclusive-OR circuit 5 for executing a logical exclusive-OR operation between an input and an output of the delay element 6 and outputting a result of the exclusive-OR operation to the delay element 6. An output of the delay element 6 is the NRZI circuit output sequence F.

Figure 1:
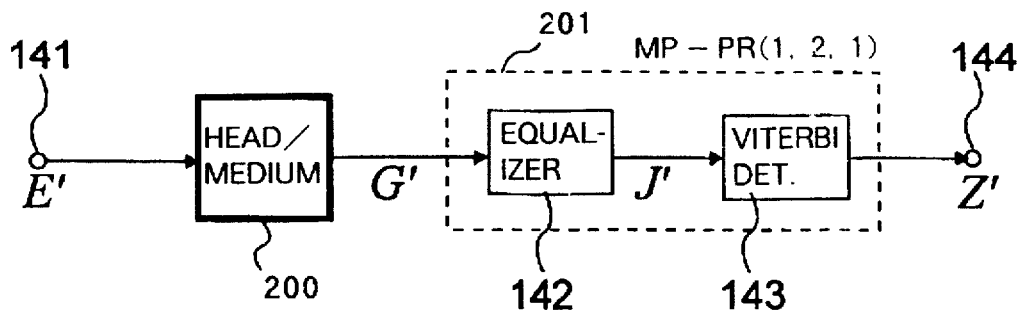
FIG. 1 is a block diagram showing a construction of a conventional PRML signal processing apparatus for use with a signal obtained by PR(1,2,1) equalization of an MP (mark position) recorded modulation code sequence wherein the minimum code reversal distance δ is 2.
Figure 2:
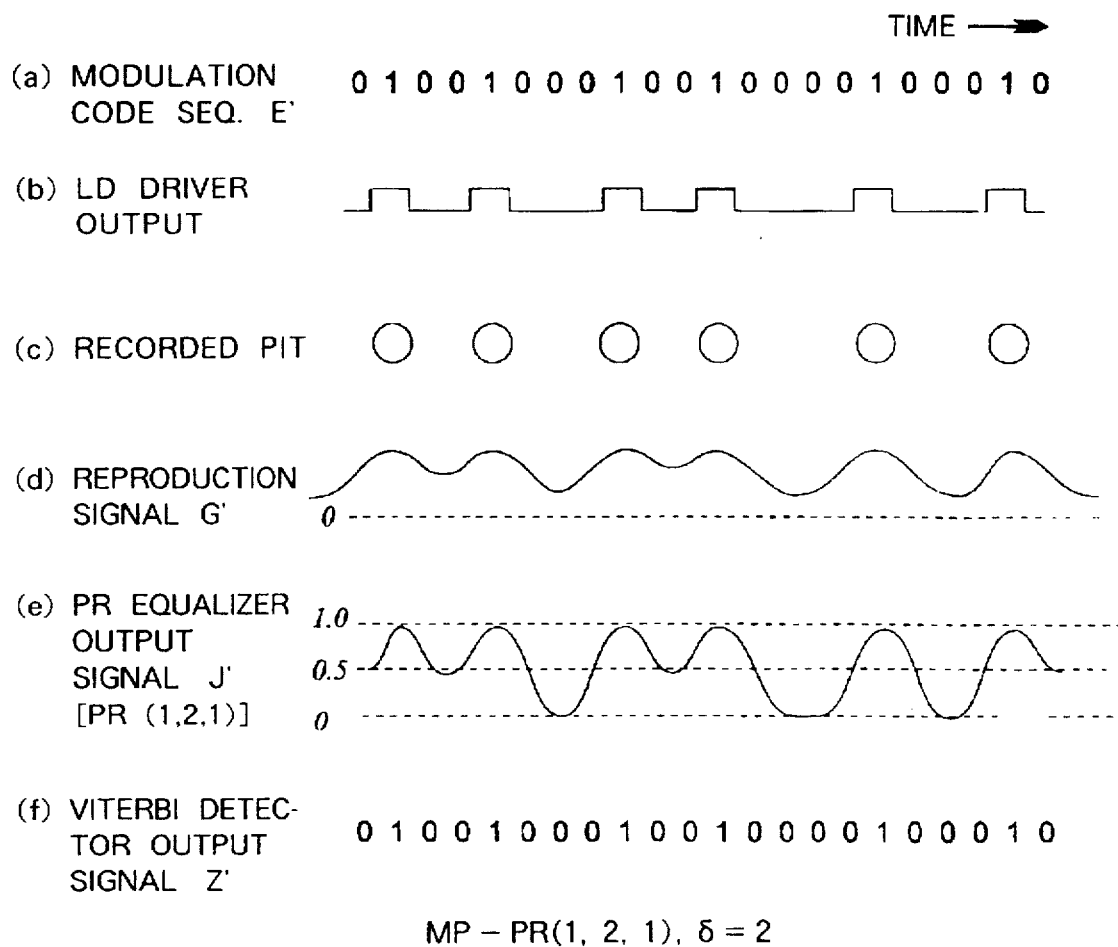
FIG. 2 is a timing chart illustrating a relationship in time among a modulation code sequence, an LD driver output, recorded pits, a reproduction signal, a PR equalizer output signal and a Viterbi detector output sequence when PR(1,2, 1) equalization is performed upon reproduction of an MP recorded signal using a modulation code wherein the minimum code reversal distance δ is 2.
Figure 3:
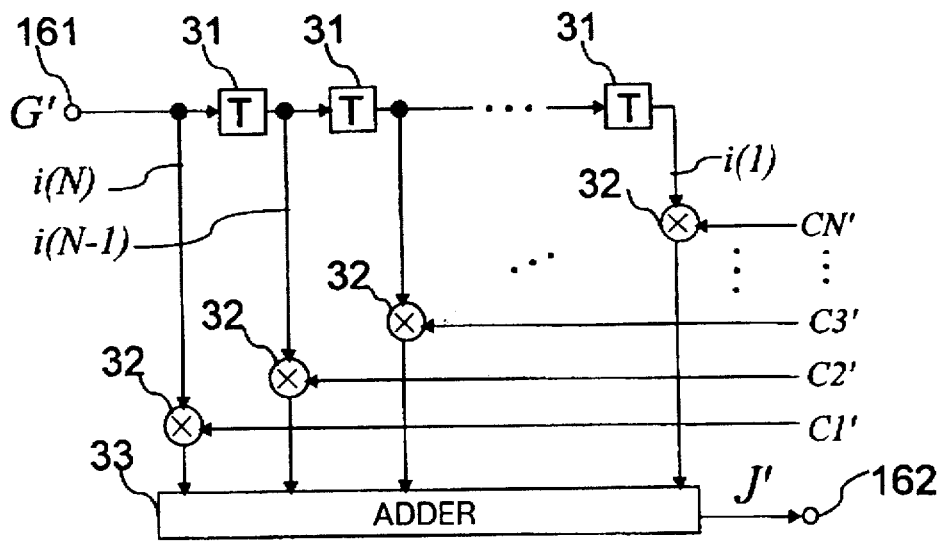
FIG. 3 is a block diagram showing a construction of a conventional PR equalizer.
Figure 4:
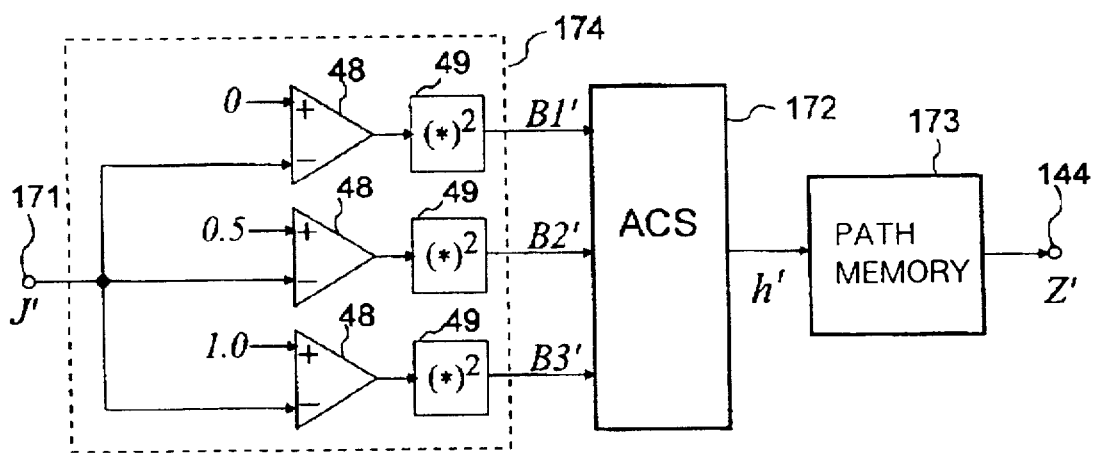
FIG. 4 is a block diagram showing a construction of a conventional Viterbi detector for use with a signal obtained by PR(1,2,1) equalization of an MP recorded modulation code sequence wherein the minimum code reversal distance δ is 2.
Figure 23:
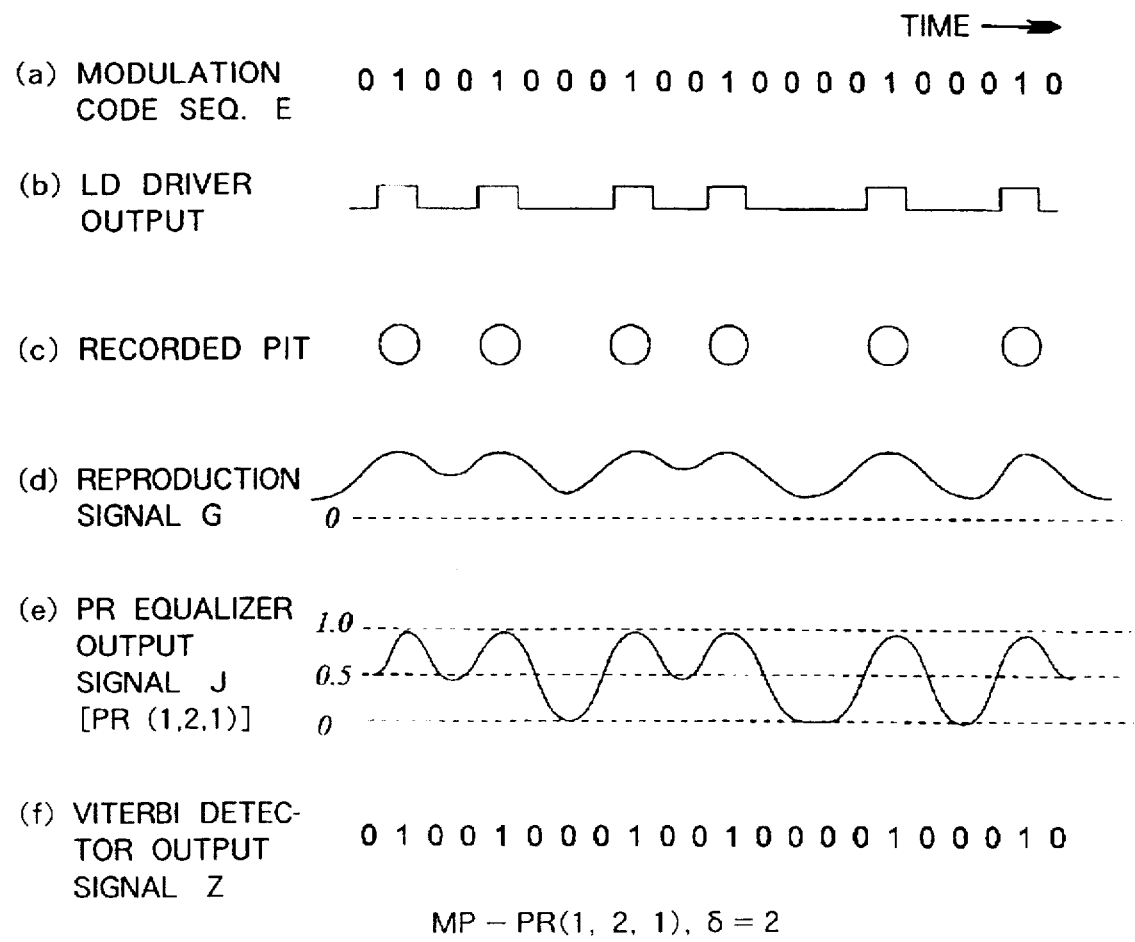
FIG. 23 is a timing chart illustrating a relationship in time among a modulation code sequence, an LD driver output, recorded pits, a reproduction signal, a PR equalizer output signal and a Viterbi detector output sequence when PR(1,2,1) equalization is performed upon reproduction of an MP recorded signal using a modulation code wherein the minimum code reversal distance δ is 2 by the signal processing apparatus shown in FIG. 22.

FIG. 23 is a timing chart illustrating signals at various portions and points in the signal processing apparatus when MP recording-PR(1,2,1) equalization is performed. In this instance, the modulation code sequence E shown by (.a) is supplied to the head/medium portion 8 directly without passing the NRZI circuit 7. An LD driver output for driving a laser diode (LD) in the head/medium portion 8 with such a modulation code sequence E as described above is shown by (b), recorded pits produced on a recording medium are shown by (c), the reproduction signal G read out from the recording medium is shown by (d), the output signal J of the PR equalizer is shown by (e), and the output signal Z of a Viterbi detector 14 is shown by (f). Those signals are shown in a synchronized relationship in the direction of time in FIG. 23. In the MP recording, since signal processing is performed based on the conventional trellis shown in FIG. 7, the signal processing circuit operates similarly to that illustrating in the timing chart (FIG. 2) of the conventional signal processing circuit.

Figure 24:
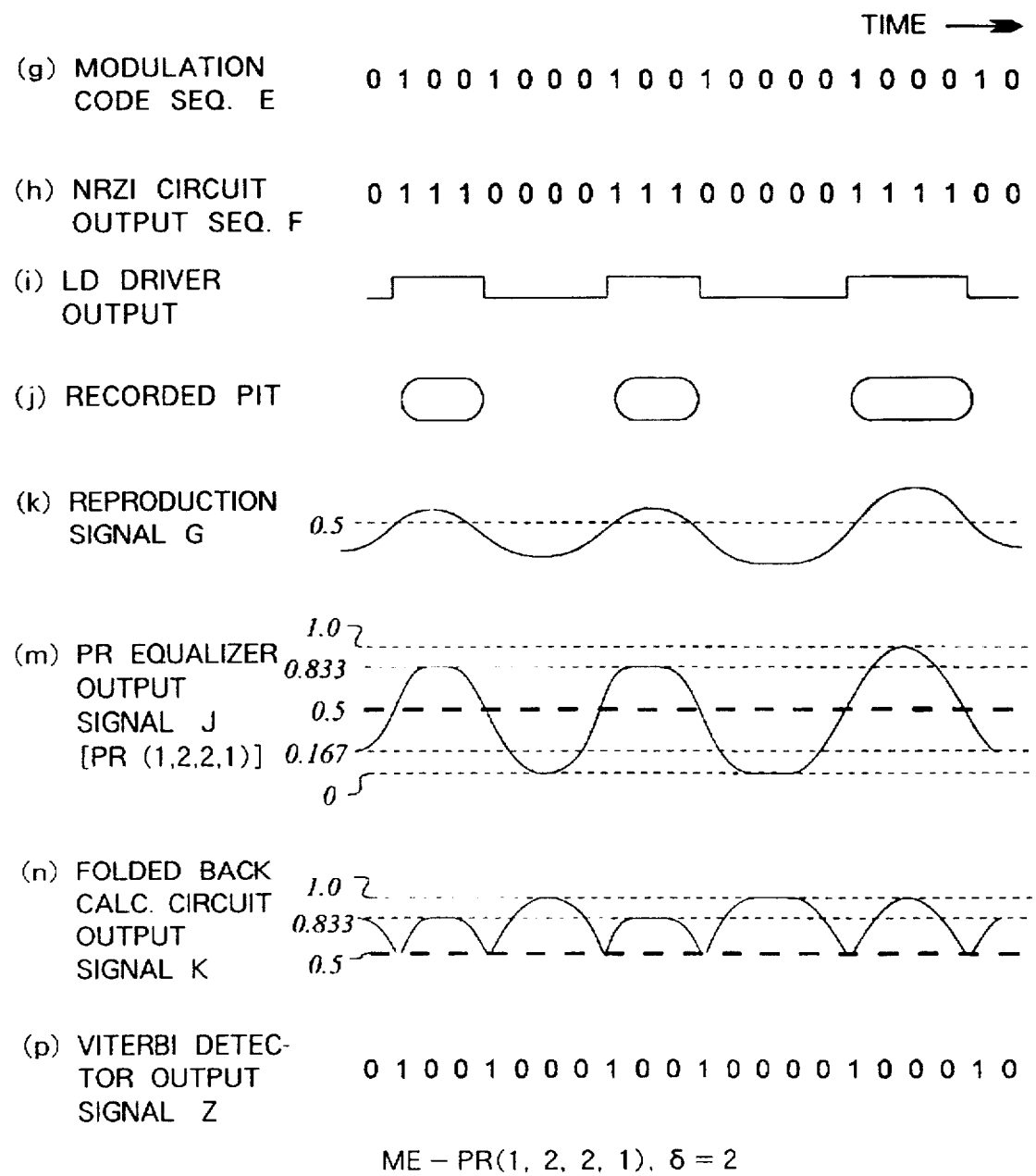
FIG. 24 is a timing chart illustrating a relationship in time among the modulation code sequence, an NRZI circuit output sequence, the LD driver output, the recorded pits, the reproduction signal, the PR equalizer output signal, a folded back value calculation circuit output signal and the Viterbi detector output sequence when PR(1,2,2,1) equalization is performed upon reproduction of an ME recorded signal using a modulation code wherein the minimum code reversal distance δ is 2 by the signal processing apparatus shown in FIG. 22.

Meanwhile, FIG. 24 is a timing chart illustrating signals at various portions and points in the signal processing apparatus when ME recording-PR(1,2,2,1) equalization is performed. The conversion performed by the NRZI circuit 7 is conversion from a sequence (i.e., modulation code sequence E) composed of {0, 1} shown by (g) in FIG. 24 into another sequence (i.e., NRZI circuit output sequence F) shown by (h) of FIG. 24, and each time the digit "1" appears in the modulation code sequence E, the digit of the NRZI circuit output sequence F reverses from "0" to "1" or from "1" to "0". The switching between the MP recording and the ME recording by the signal switch 2 is controlled by a signal switch control line 16 extending from the control circuit 20. If a signal switch control signal u(1) transmitted using the signal switch control line 16 is "0", then connection to the MP contact 3 is established by the signal switch 2, but if signal switch control signal u(1) is "1", then connection to the ME contact 4 is established.

When recording onto an optical disk medium is to be performed, in the head/medium portion 8, the LD driver output [(i) of FIG. 24] changes to an on-state at a timing when the output signal of the recording signal processing section 21 (the modulation code sequence E upon MP recording, but the NRZI circuit output sequence F upon ME recording), that is, a signal corresponding to a recorded mark (recorded pit) train to be formed on an optical disk medium, is "1". Consequently, at the same point of time, a recorded pit is produced on the recording medium as seen from (j) of FIG. 24. When the data recorded in this manner are reproduced, the recorded pits are swept by the reproduction head along a recording direction of them, and the reproduction head converts presence or absence of a recorded pit into a reproduction signal level depending upon whether the amount of reflected laser light from the surface of the medium is high or low to produce a reproduction signal G. An example of variations of signals of the head/medium portion 8 when the MP recording or the ME recording is selected for the same modulation code sequence E is shown by (b) to (d) of FIG. 23 for the MP recording and by (i) to (k) of FIG. 24 for the ME recording.

In the signal processing apparatus shown in FIG. 22, the reproduction signal G from the reproduction head is inputted to the reproduction signal processing section 22. In the reproduction signal processing section 22, the reproduction signal G is first inputted to a PR equalizer 9, by which it is equalized so that it has a PR waveform. A tap coefficient switch control line 17 extends from the control circuit 20 to the PR equalizer 9 so that a PR equalizer control signal (tap coefficient switch control signal) u(2) is transmitted to the PR equalizer 9 via the tap coefficient switch control line 17. If the control signal u(2) is "0", then tap coefficients for the PR equalizer 9 are set to such values that a reproduction signal after MP recording of a modulation code sequence wherein the minimum code reversal distance δ is 2 is PR(1,2,1) equalized. If the control signal u(2) is "1", then the tap coefficients for the PR equalizer 9 are set to such values that a reproduction signal after ME recording of a modulation code sequence wherein the minimum code reversal distance δ is 2 is PR(1,2,2,1) equalized. A relationship between the reproduction signal G and a PR equalizer output signal J upon MP recording is shown by (d) and (e) of FIG. 23, and a relationship between the reproduction signal G and the PR equalizer output signal J upon ME recording is shown by (k) and (m) of FIG. 24.

The signal J after PR equalization when an MP or ME recorded signal is reproduced is inputted to a signal switch 10 in the reproduction signal processing section 22. The signal switch 10 connects the input thereof to an MP contact 11 in response to the MP recording, but connects the input thereof to an ME contact 12 in response to the ME recording similarly to the signal switch 2 of the recording signal processing section 21. The control of the signal switch 10 is performed based on a signal switch control signal u(3) transmitted thereto via a signal switch control line 18 extending from the control circuit 20, and if the control signal u(3) is "0", then connection to the MP contact 11 is established by the signal switch 10, but if the control signal u(3) is "1", then connection to the ME contact 12 is established. Since the MP contact 11 is connected directly to the input of the Viterbi detector 14 and the ME contact 12 is connected to the input of the Viterbi detector 14 via a folded back calculation circuit 13, upon reproduction of an MP.recorded signal, the PR equalizer output signal J is inputted directly to the Viterbi detector 14 from the MP contact 11, but upon reproduction of an ME recorded signal, the PR equalizer output signal J passes from the ME contact 12 through the folded back calculation circuit 13 to make a folded back calculation circuit output signal K, whereafter it is inputted to the Viterbi detector 14.

The folded back calculation circuit 13 which is used only upon the ME recording is a circuit whose output signal y is x if an input signal x thereto is x≧VL with respect to a fixed signal level VL, but is y=2·VL−x if x<VL. A relationship between the input signal to the folded back calculation circuit 13 (the PR equalizer output signal J) and the folded back calculation circuit output signal K is shown by (m) and (n) of FIG. 24. In the example of FIG. 24, the value VL is set to 0.5, and the input signal lower than the level of 0.5 in (m) of FIG. 24 appears, in the output shown by (n) of FIG. 24, in a folded back condition symmetrical to that of the level higher than 0.5 with respect to the level of 0.5.

In the reproduction signal processing section 22, the PR equalizer output signal J upon reproduction of an MP recorded signal or the folded back calculation circuit output signal K upon reproduction of an ME recorded signal is inputted to the Viterbi detector 14. Also a reference amplitude switch control line 19 is connected to the Viterbi detector 14, and a reference amplitude switch control signal u(4) is inputted from the control circuit 20 to the Viterbi detector 14 via the reference amplitude switch control line 19. If the control signal u(4) is "0", then the Viterbi detector 14 effects Viterbi detection switching the internal reference amplitudes thereof to value suitable for Viterbi detection of a signal obtained by MP recording-PR(1,2,1) equalization and outputs a Viterbi detector output signal Z composed of binary symbols {0, 1} to the Viterbi detector output terminal 15. If the control signal u(4) is "1", then the Viterbi detector 14 effects Viterbi detection switching the internal reference amplitudes to different values suitable for Viterbi detection of a signal obtained by ME recording-PR(1,2,2,1) to obtain a Viterbi detector output signal Z and outputs the Viterbi detector output signal Z to the Viterbi detector output terminal 15.

While the construction described above is an apparatus which has functions of recording data onto a disk medium and reproducing the recorded data, it is apparent that both of an MP recorded read-only disk and an ME recorded read-only disk can be reproduced by using an apparatus which includes only the reproduction signal processing section 22 and the control circuit.

Figure 25:
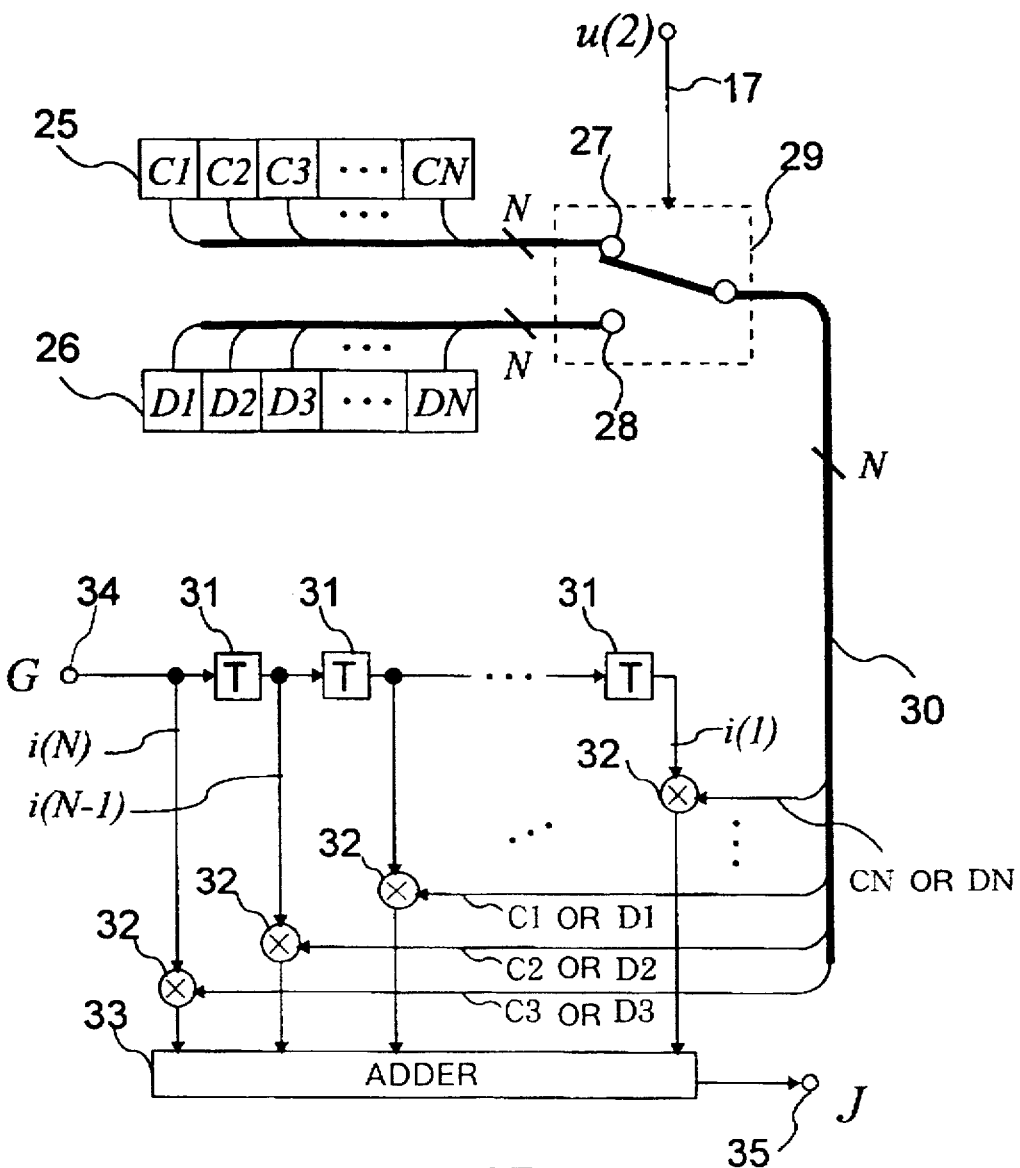
FIG. 25 is a block diagram showing a construction of a partial response (PR) equalizer used by the signal processing apparatus shown in FIG. 22.

FIG. 25 is a block diagram showing an example of construction of the PR equalizer 9. The PR equalizer shown includes an MP tap coefficient memory 25 in which equalizer tap coefficients C1, C2, ..., CN for MP recording-PR (1,2,1) equalization are stored, an ME tap coefficient memory 26 in which equalizer tap coefficients D1, D2, ..., DN for ME recording-PR(1,2,2,1) are stored, a tap coefficient switch 29 which is controlled by the tap coefficient switch control signal u(2) inputted thereto via the tap coefficient switch control line 17, N-1 delay elements 31, N multipliers 32, and an adder 33 for calculating the sum of outputs of the multipliers 32 and outputting the sum as a PR equalizer output signal J to a PR equalizer output terminal 35. The tap coefficient switch 29 connects, if the control signal u(2) is "0", the MP tap coefficient memory 25 and N parallel tap coefficient transmission lines 30 to each other via MP contacts 27, but if the control signal u(2) is "1", then the tap coefficient switch 29 connects the ME tap coefficient memory 26 and the tap coefficient transmission lines 30 via ME contacts 28. Meanwhile, the delay elements 31 provide each a delay of one unit time to an input thereto and are provided in series to a PR equalizer input terminal 34.

Operation of the PR equalizer when the control signal u(2) is "0", that is, in MP recording, will be described. Upon MP recording, the N equalizer tap coefficients C1, C2, ..., CN for MP recording-PR(1,2,1) equalization are inputted from the MP tap coefficient memory 25 independently of each other to the N multipliers 32 via the tap coefficient transmission lines 30. Meanwhile, a reproduction signal G upon MP recording passes the train of the delay elements 31, during which N tap output signals i(N), i(N-1), ..., i(1) having a delay time difference T from each other are produced. The tap output signals are inputted independently of each other to the N multipliers 32. For example, to one of the two inputs of a multiplier 32 to the other input of which the tap output signal i(N) is inputted, the equalizer tap coefficient C1 from among the tap coefficients is inputted, and i(N)C1 is calculated by this multiplier. A result of the calculation is outputted to the adder 33. Similarly, to those multipliers 32 to which the tap output signals i(N-1), i(N-2), ..., i(1) are inputted, C2, C3, ..., CN are inputted, respectively. As a result, i(N)C1+i(N-1)C2+ ... +i(1)CN is calculated by the multipliers 32 and the adder 33 and outputted to the PR equalizer output terminal 35.

On the other hand, when the control signal u(2) is "1", that is, in ME recording, connections to the ME contacts 28 are established by the tap coefficient switch 29 so that N tap coefficients D1, D2, ..., DN for ME recording-PR(1,2,2,1) equalization are inputted independently of each other from the ME tap coefficient memory 26 to the N multipliers 32 via the tap coefficient transmission lines 30. As a result, i(N) D1+i(N-1)D2+ ... +i(1)DN is calculated by the multipliers 32 and the adder 33 and outputted to the PR equalizer output terminal 35.

Further, when the distribution of the power density of the reproduction signal G is varied by a variation of the speed of rotation of the disk or a like cause during reproduction of the disk, if tap coefficient values set from the tap coefficient memory 25 or 26 continue to be used, then it sometimes becomes impossible to equalize the reproduction signal G so that it may have a PR waveform. In such an instance, it is possible to always equalize a reproduction signal so that it may have a desired PR waveform by adding to the PR equalizer a circuit which operates, for example, based on a mean square error (MSE) method to adaptively control the tap coefficients. Also in this instance, before an adaptive operation for the tap coefficients is started, convergence of the tap coefficients is performed rapidly if initial values of the tap coefficients are set to the PR equalizer using the tap coefficient memories 25 and 26 and the tap coefficient switch 29, and the time for a training operation of the equalizer for converging the tap coefficients can be reduced.

Figure 26A:
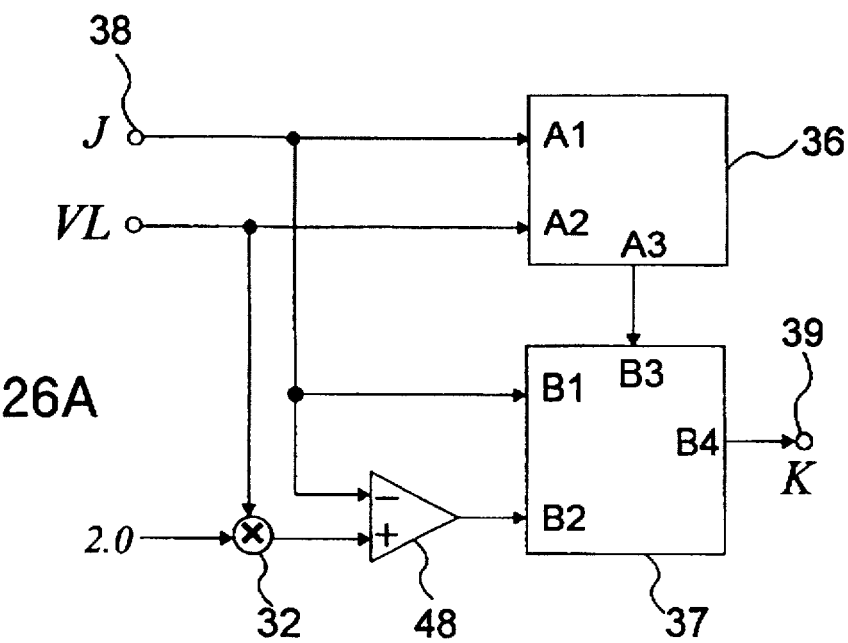
FIG. 26A is a block diagram showing an example of construction of a folded back value calculation circuit employed by the signal processing apparatus shown in FIG. 22.

Next, a construction of the folded back calculation circuit 13 in the reproduction signal processing section 22 will be described. FIG. 26A is a view showing an example of construction of the folded back calculation circuit 13. The folded back calculation circuit 13 shown includes a signal comparator 36, a signal selector 37, a multiplier 32 and a subtractor 48. Upon ME recording, a PR equalizer output signal J is inputted from a folded back calculation circuit input terminal 38 and transmitted to an input terminal A1 of the signal comparator 36 and an input terminal B1 of the signal selector 37. A signal level VL is inputted to the other input terminal A2 of the signal comparator 36. The signal level VL is a value which defines the boundary along which a folding back operation is to be performed upon reproduction of an ME recorded signal, and here, VL=0.5 in an relative level, that is, the center level of the PR equalizer output signal J. Here, the relative level is a scale in which it is assumed that the maximum and minimum values of the PR equalizer output signal J are 1.0 and 0.0, respectively.

Where the input signal levels to the input terminals A1 and A2 of the signal comparator 36 are represented by Level(A1) and Level(A2), respectively, if Level(A1)≧Level (A2), then the signal comparator 36 outputs "0" from an output terminal A3 thereof to an input terminal B3 of the signal selector 37, but if Level(A1)<Level(A2), then the signal comparator 36 outputs "1" from the output terminal A3 thereof to the input terminal B3 of the signal selector 37. The signal selector 37 is a circuit which outputs, when the input level to the input terminal B3 is "0", the input value to the input terminal B1, but outputs, when the input level to the input terminal B3 is "1", the input value to the input terminal B2, as a folded back calculation circuit output signal K from an output terminal B4 to a folded value calculation circuit output terminal 39. A value 2·VL−J to be applied to the input terminal B2 of the signal selector 37 is calculated by the multiplier 32 and the subtractor 48. By the operations described above, if J≧VL, then K=J, but if J<VL, then k=2·VL−J, is outputted from the folded value calculation circuit output terminal 39.

Figure 26B:
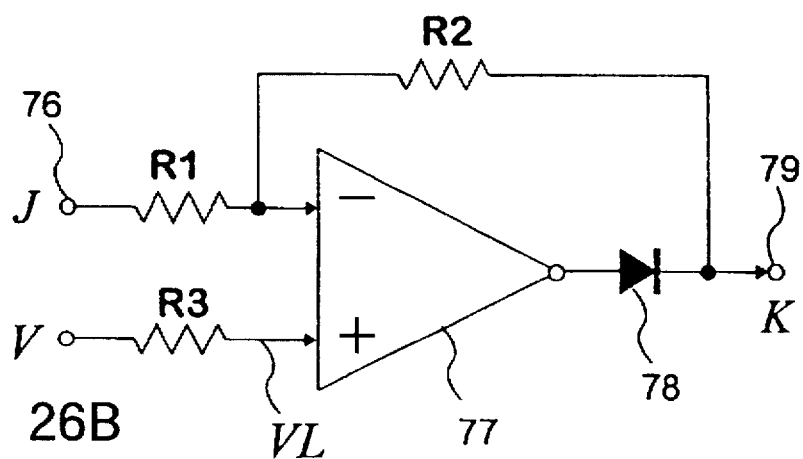
FIG. 26B is a circuit diagram showing another example of construction of the folded back value calculation circuit.

FIG. 26B is a circuit diagram showing another example of construction of the folded back calculation circuit 13. The circuit shown includes a differential amplifier 77, a rectifier (diode) 78, and three resistors R1 to R3. In the present circuit, a voltage V is inputted to a (+) input terminal of the differential amplifier 77 via the resistor R3 so that the potential at the (+) input terminal may be VL. Meanwhile, the resistance value of the resistor R1 and the resistance value of the resistor R2 are set equal to each other. An output of the differential amplifier 77 is fed back to a (−) input terminal of the differential amplifier 77 via the rectifier 78 and the resistor R2. Further, a PR equalizer output signal J is inputted to the (−) input terminal of the amplifier 77 from a folded value calculation circuit input terminal 76 via the resistor R1. Upon reproduction operation, if J≧VL, then electric current inputted from the folded value calculation circuit input terminal 76 reaches directly to an output terminal 79 via the resistors R1 and R2 by an action of the rectifier 78, and as a result, the potential of the folded back value calculation circuit output signal K becomes equal to the PR equalizer output signal J. On the other hand, if J<L, then the output current of the differential amplifier 77 flows into the (−) input terminal of the differential amplifier 77 via the rectifier 78 and the resistor R2, and the potential at the (−) input terminal becomes equal to VL. In this instance, since R1=R2, K=2·VL−J, and an operation necessary for the folded back calculation circuit 13 is performed.

Figure 26C:
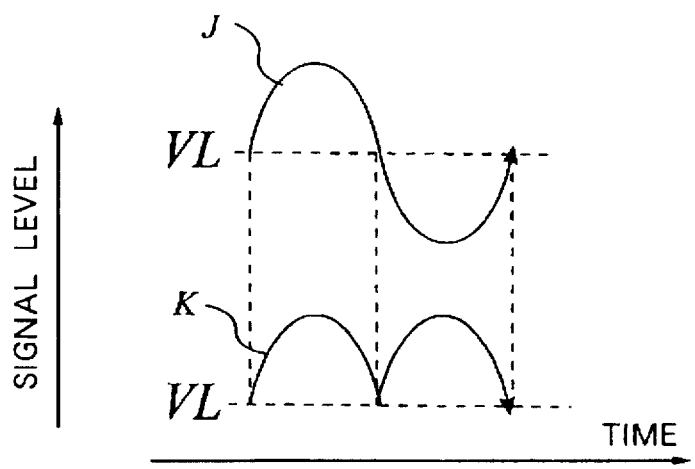
FIG. 26C is a graph illustrating a relationship between an input signal to and an output signal from the folded back value calculation circuit.

Even if the construction of the folded back calculation circuit 13 is such as shown in FIG. 26A or such as shown in FIG. 26B, the input and output characteristics of the folded back calculation circuit 13 are such as shown in FIG. 26C.

Figure 27:
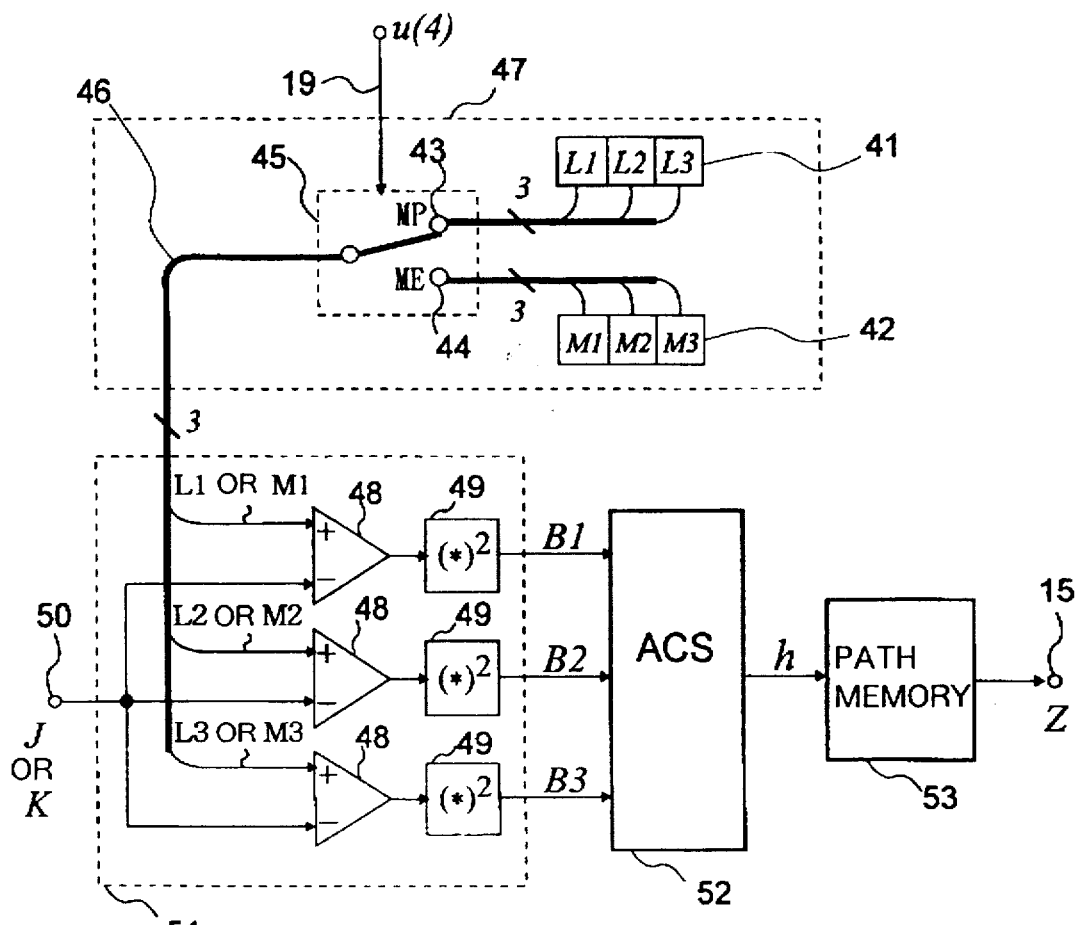
FIG. 27 is a block diagram showing a first example of construction of a Viterbi detector used by the signal processing apparatus shown in FIG. 22.

Next, a construction of the Viterbi detector 14 will be described in detail. FIG. 27 is a block diagram showing a first example of construction of the Viterbi detector. The present Viterbi detector is used for a modulation code sequence E wherein the minimum code reversal distance δ is 2, and includes a reference amplitude selection section 47, a branch metric calculation circuit 51, an ACS circuit 52 and a path memory 53.

The reference amplitude selection section 47 includes an MP reference amplitude memory 41 for storing reference amplitudes L1, L2 and L3 for the MP recording, an ME reference amplitude memory 42 for storing reference amplitudes M1, M2 and M3 for the ME recording, and a reference amplitude switch 45 for selecting one of the reference amplitude memories 41 and 42 to output the reference amplitudes via a three-parallel reference amplitude transmission line 46. Meanwhile, the branch metric calculation circuit 51 includes three subtractors 48 connected to a Viterbi detector input terminal 50, and three square operators 49 for outputting branch metrics B1, B2 and B3, respectively, to the ACS circuit 52. Each of the square operators 49 squares an output of a corresponding one of the subtractors 48 and outputs the squared value as a branch metric. The ACS circuit 52 outputs a path memory control signal h based on the branch metrics B1, B2 and B3 to the path memory 53.

The reference amplitude selection section 47 sets, before a reproduction operation is performed, the reference amplitudes L1, L2 and L3 or the reference amplitudes M1, M2 or M3 to the branch metric calculation circuit 51 by the following procedure. In the reference amplitude selection section 47, if the reference amplitude switch control signal u(4) on the reference amplitude switch control line 19 is "0", then the reference amplitude switch 45 connects the reference amplitude transmission line 46 to MP contacts 43 so that the reference amplitudes L1, L2 and L3 stored in the MP reference amplitude memory 41 are inputted to the (+) terminals of the three subtractors 48 in the branch metric calculation circuit 51 via the reference amplitude transmission line 46. On the other hand, if the reference amplitude switch control signal u(4) is "1", then the reference amplitude switch 45 connects the reference amplitude transmission line 46 to ME contacts 44 so that the reference amplitudes M1, M2 and M3 stored in the ME reference amplitude memory 42 are inputted to the (+) terminals of the three subtractors 48 via the reference amplitude transmission line 46. The values of the reference amplitudes should be made coincide with aimed equalization values of the equalizers. In the example described here, for the MP recording, since PR(1,2,1) equalization is performed by the PR equalizer, L1=0, L2=0.5 and L3=1.0. Similarly, for the ME recording, since PR(1,2,2,1) equalization is performed by the PR equalizer and a folded back value K with respect to the equalizer output signal J of 0.5 is outputted to the Viterbi detector, M1=1.0, M2=0.833 and M3=0.5.

Here, where the reference values for the MP recording are set in the order of L1=0, L2=0.5 and L3=1.0 mentioned hereinabove with reference to FIG. 27, the reference amplitudes for the ME recording are determined as M1=1.0, M2=0.833 and M3=0.5 as described hereinabove. By adopting such a setting method for reference amplitudes to the reference amplitude memories 41 and 42 as described above, whichever one of the MP recording and the ME recording has been performed for a signal, a reproduction signal from the recorded signal can be processed by operation of the ACS circuit 52.

Upon a reproduction operation, when an MP recorded signal is to be reproduced, an output signal J of the PR(1,2,1) equalizer is inputted to the Viterbi detector input terminal 50. This input signal J is inputted to the (−) terminals of the three subtractors 48. The subtractors 48 calculate 0−J, 0.5−J and 1.0−J from the input signal J and the reference amplitudes {0, 0.5, 1.0} set in such a manner as described above and outputs them independently of each other to the respective square operators 49. The individual square operators 49 calculate branch metrics:

$$B1=(0-J)^2, B2=(0.5-J)^2, B3=(1.0-J)^2 \qquad (9)$$

which are square values of the input signals thereto, at each point of time, and outputs the calculated branch metrics to the ACS circuit 52.

On the other hand, when an ME recorded signal is to be reproduced, an output signal K of the folded back calculation circuit 13 is inputted to the Viterbi detector input terminal 50. By the operation of the folded back calculation circuit 13, only a level which is higher than the level VL appears with the folded back calculation circuit output signal K. Then, the signal K is inputted to the (−) terminals of the three subtractors 48 similarly as in processing of an MP recorded signal. The subtractors 48 calculate 1.0−K, 0.833−K and 0.5−K from the folded back calculation circuit output signal K and the reference amplitudes {0.5, 0.833, 1.0} for the Viterbi detector described hereinabove, and output the calculated values independently of each other to the respective square operators 49. The square operators 49 calculate branch metrics $$B1=(1.0-K)^2, B2=(0.833-K)^2,$$

$$B3=(0.5-K)^2 \qquad (10)$$

which are square values of the three input signals, at each point of time, and send the calculated branch metrics to the ACS circuit 52.

The ACS circuit 52 has, in the inside thereof, values P(1), P(2) and P(3) called path metrics. The path metrics P(1), P(2) and P(3) are initially set, before a reproduction operation is performed, to $$P(1)=P(2)=P(3)=0 \qquad (11)$$

Then, upon a reproduction operation, the ACS circuit 52 performs, at each point of time, based on the branch metrics B1, B2 and B3 calculated based on equation (9) or equation (10) and inputted thereto, from P(1) to P(3) obtained by the last point of time and B1, B2 and B3 obtained at the present point of time, comparison between P(1)+B2 and P(3)+B1. Then, the ACS circuit 52 determines the value of the path memory control signal (detection sequence switch control signal) h so that if P(1)+B2≧P(3)+B1, then h=0, if P(1)+B2<P(3)+B1, then h=1 (12)

may be satisfied, and outputs the determined value of the path memory control signal h to the path memory 53. Further, the ACS circuit 52 updates the values of the path metrics P(1), P(2) and P(3) in accordance with

P(1)=P(2)+B3,

P(2)=P(3)+B2,

P(3)=min{P(1)+B2, P(3)+B1} (13)

respectively, where min{α, β} is an operator which signifies a lower value between α and β.

Figure 5:
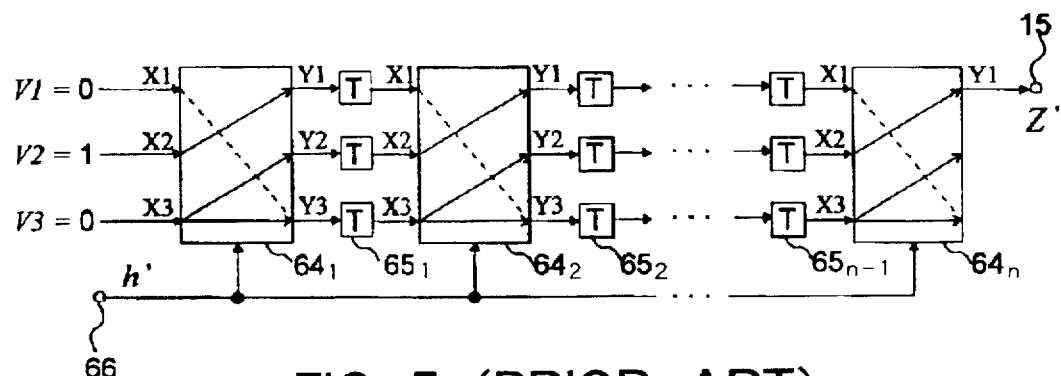
FIG. 5 is a block diagram showing a construction of a path memory used in a conventional Viterbi detector for MP recording-PR(1,2,1) equalization.
Figure 6A:
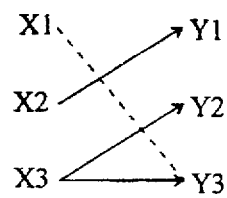
FIGS. 6A and 6B are diagrammatic views illustrating a relationship between values of path memory control signals of the path memory shown in FIG. 5 and an internal connection condition of a detection sequence switch.
Figure 6B:
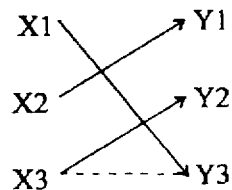
Figure 28:
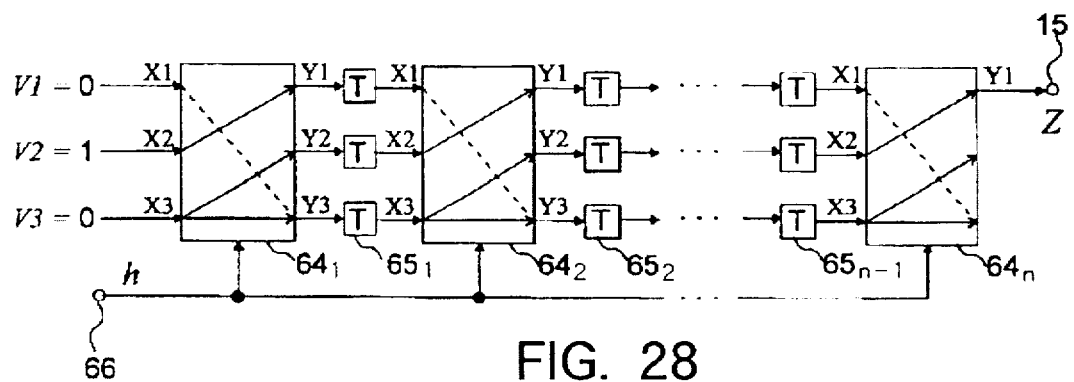
FIG. 28 is a block diagram showing a construction of a path memory used by the Viterbi detector of the first example of construction.
Figure 29A:
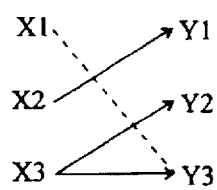
FIGS. 29A and 29B are diagrammatic views illustrating a relationship between values of path memory control signals to the path memory shown in FIG. 28 and an internal connection condition of a detection sequence switch.
Figure 29B:
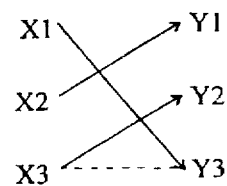

FIG. 28 shows a construction of the path memory 53. The path memory 53 is used not only for Viterbi detection of a reproduction signal after MP recording-PR(1,2,1) equalization but also for Viterbi detection of a reproduction signal after ME recording-PR(1,2,2,1) equalization. The construction of the path memory 53 is similar to the construction of the path memory of the conventional signal processing apparatus shown in FIG. 5. FIGS. 29A and 29B show connection patterns of the input terminals and the output terminals of the detection sequence switches $64_1$ to $64_n$ in the path memory 53, and FIG. 29A corresponds to the case of h=0 while FIG. 29B corresponds to the case of h=1.

As shown in FIG. 28, the path memory 53 includes n detection sequence switches $64_1$ to $64_n$, and 3(n-1) delay elements $65_1$ to $65_{n-1}$ (indicated by "T"). Each delay element consists of, for example, a flip flop (FF) circuit. Every three delay elements $65_1$ to $65_{n-1}$ constitute respective sets and the sets of three delay elements interposed between individual adjacent ones of the detection sequence switches $64_1$ to $64_n$. Each of the delay elements $65_1$ to $65_{n-1}$ outputs an input thereto after delaying it by one unit time. The path memory control signal h is inputted to the detection sequence switches $64_1$ to $64_n$ via a common path memory control signal input terminal 66.

In FIG. 28, when the path memory control signal h is h=0 and 1, the connections between the input and output terminals of any of the detection sequence switches $64_1$ to $64_n$ are such as shown in FIGS. 29A and 29B, respectively. Then, all of values of the delay elements $65_1$ to $65_{n-1}$ connected to the output terminals of the detection sequence switches $64_1$ to $64_{n-1}$ except the last stage are shifted in the rightward direction toward the next delay elements via the respective detection sequence switches. Simultaneously, V1=0, V2=1 and V3=0 which are candidates for Viterbi detector output sequence digit are inputted to input terminals X1, X2 and X3 of the first detection sequence switch $64_1$, and those input digits are inputted to the three delay elements $65_1$ via the detection sequence switch $64_1$ and the output terminals Y1, Y2 and Y3 of the detection sequence switch $64_1$. Consequently, a Viterbi detector output signal Z for one period of time is outputted from the Viterbi detector output terminal 15. Here, if the connection condition of the detection sequence switch is that in the case of h=0 shown in FIG. 29A, then the values V2=1, V3=0 and V3=0 inputted from the input terminals X2, X3 and X3 reach the output terminals Y1, Y2 and Y3, respectively, and V1=0 does not reach any output terminal of the detection sequence switch. By performing the procedure described above at each point of time, a Viterbi detector output signal Z composed of binary symbols {0, 1} is obtained from the Viterbi detector output terminal 15. While, in FIG. 28, only the output terminal Y1 of the detection sequence switch $64_n$ in the last stage is connected to the Viterbi detector output terminal 15, if the number n of the detection sequence switches is sufficiently high as several tens or more, then the sequences to be outputted from the output terminals Y1, Y2 and Y3 of the detection sequence switch $64_n$ become same as each other.

Figure 7:
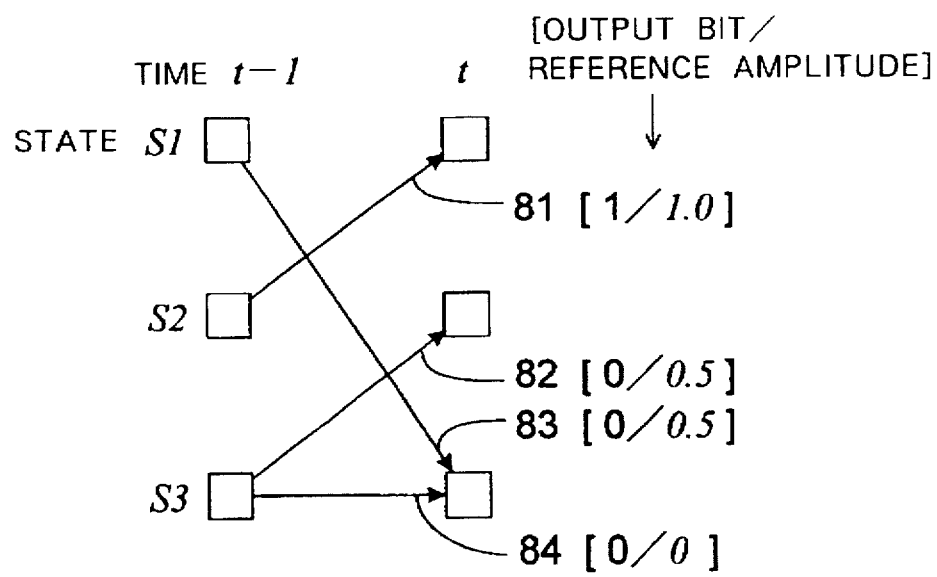
FIG. 7 is a diagrammatic view showing a trellis of a Viterbi detector for use with a signal obtained by PR(1,2,1) equalization of an MP recorded modulation code sequence wherein the minimum code reversal distance δ is 2.
Figure 8:
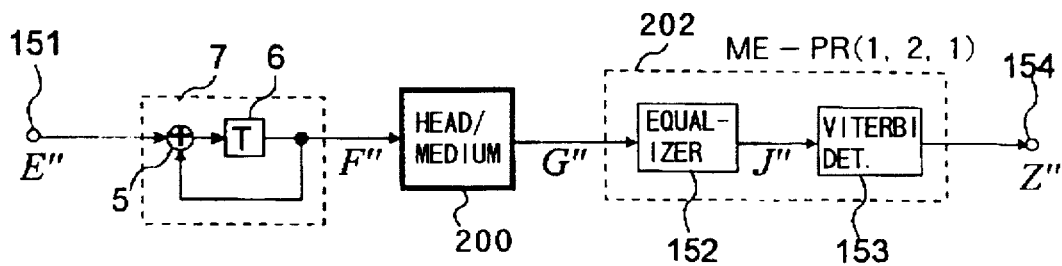
FIG. 8 is a block diagram showing a construction of a conventional PRML signal processing apparatus for use with a signal obtained by PR(1,2,1) equalization of an ME (mark edge) recorded modulation code sequence wherein the minimum code reversal distance δ is 2.
Figure 9:
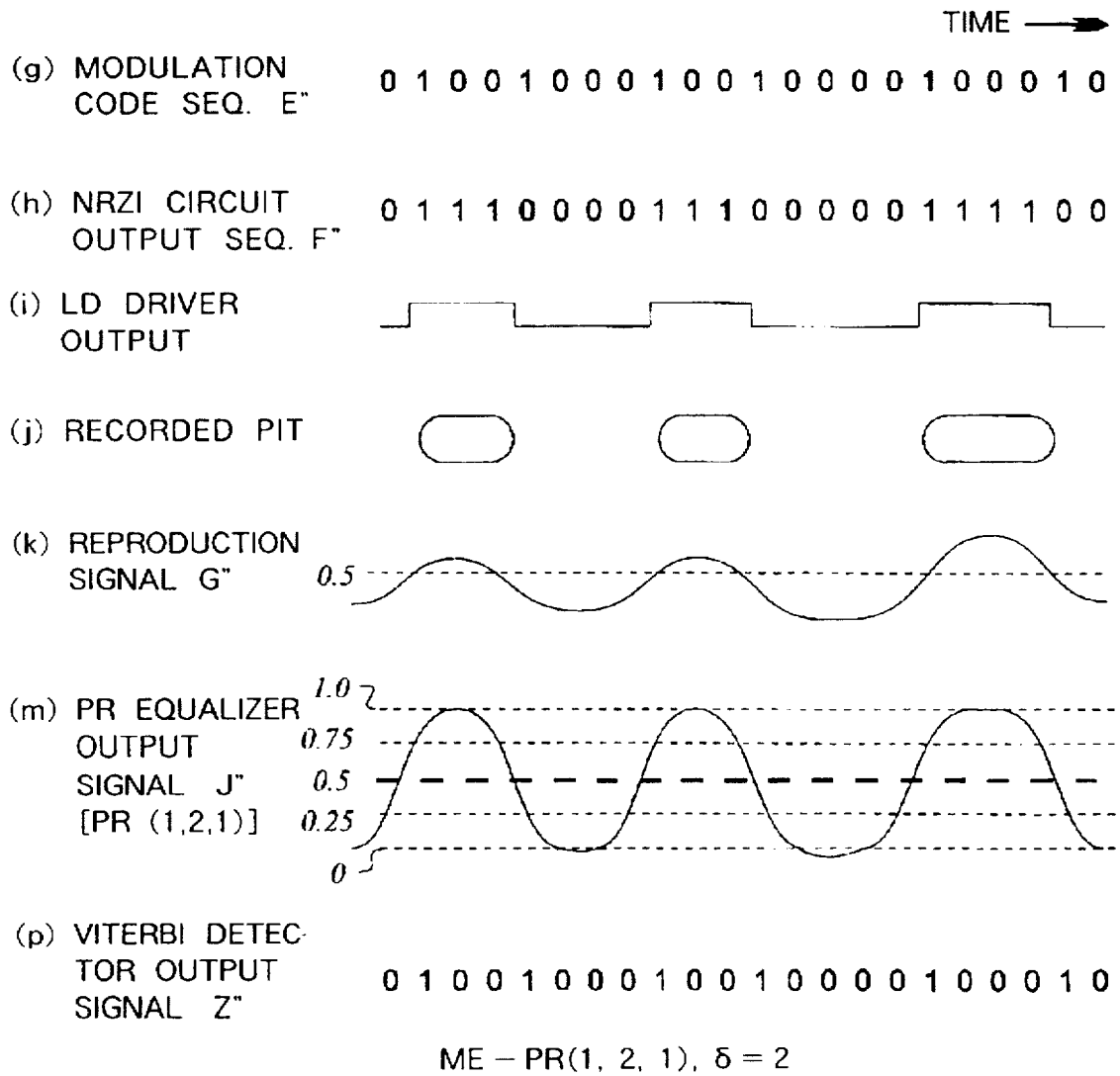
FIG. 9 is a timing chart illustrating a relationship in time among a modulation code sequence, an NRZI circuit output sequence, an LD driver output, recorded pits, a reproduction signal, a PR equalizer output signal and a Viterbi detector output sequence when PR(1,2,1) equalization is performed upon reproduction of an ME recorded signal using a modulation signal wherein the minimum code reversal distance δ is 2 by the conventional apparatus.
Figure 10:
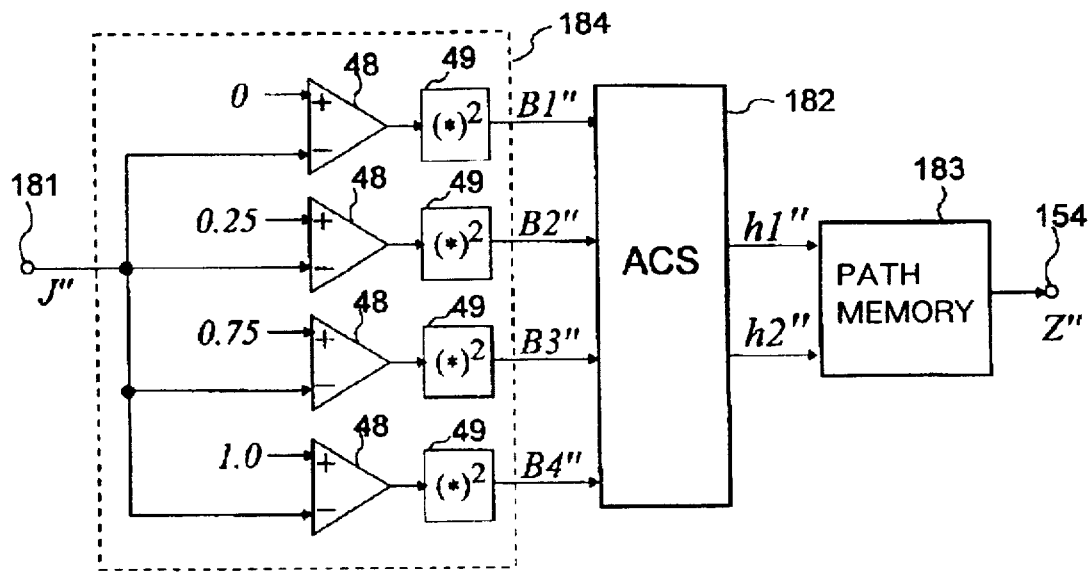
FIG. 10 is a block diagram showing a construction of a conventional Viterbi detector for use of a signal obtained by PR(1,2,1) equalization of an ME recorded modulation code sequence wherein the minimum code reversal distance δ is 2.
Figure 11:
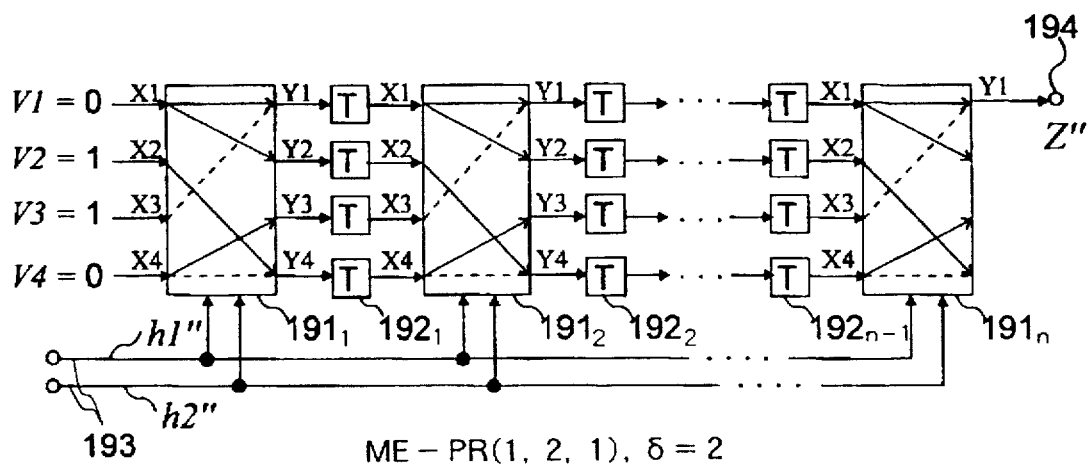
FIG. 11 is a block diagram showing a construction of a path memory employed in the Viterbi detector shown in FIG. 10.
Figure 12A:
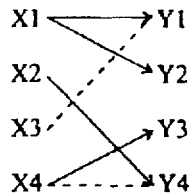
FIGS. 12A, 12B, 12C and 12D are diagrammatic views illustrating a relationship between values of path memory control signals to the path memory shown in FIG. 11 and an internal connection condition of a detection sequence switch.
Figure 12B:
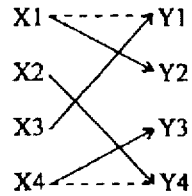
Figure 12C:
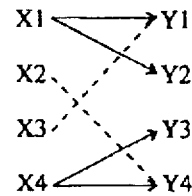
Figure 12D:
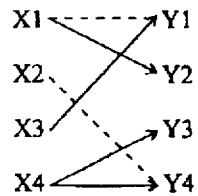
Figure 13:
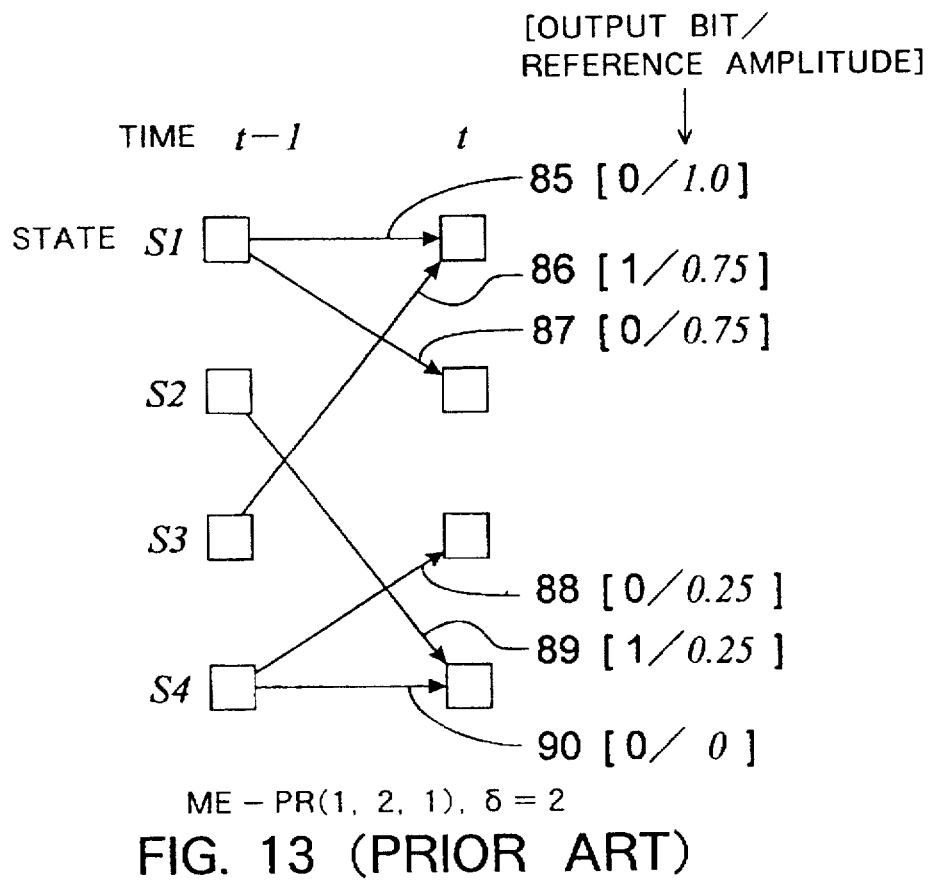
FIG. 13 is a diagrammatic view showing a trellis of a Viterbi detector used for a signal obtained by PR(1,2,1) equalization of an ME recorded modulation code sequence wherein the minimum code reversal distance δ is 2.

The reason why the path memory 53 is used both upon reproduction of an MP recorded signal and upon reproduction of an ME recorded signal is that the trellis for MP recorded signal reproduction-PR(1,2,1) equalization shown in FIG. 7 and the degeneracy trellis for ME recorded signal reproduction-PR(1,2,2,1) equalization have the same structure. Accordingly, the path memory 53 can be used commonly for both of a reproduction signal after MP recording-PR(1,2,1) equalization and another reproduction signal after ME recording-PR(1,2,2,1) equalization, and consequently, the circuit scale of the present embodiment is reduced to approximately one half that of the conventional apparatus wherein PRML signal processing apparatus are provided separately for the ME recording and for the MP recording.

Figure 30:
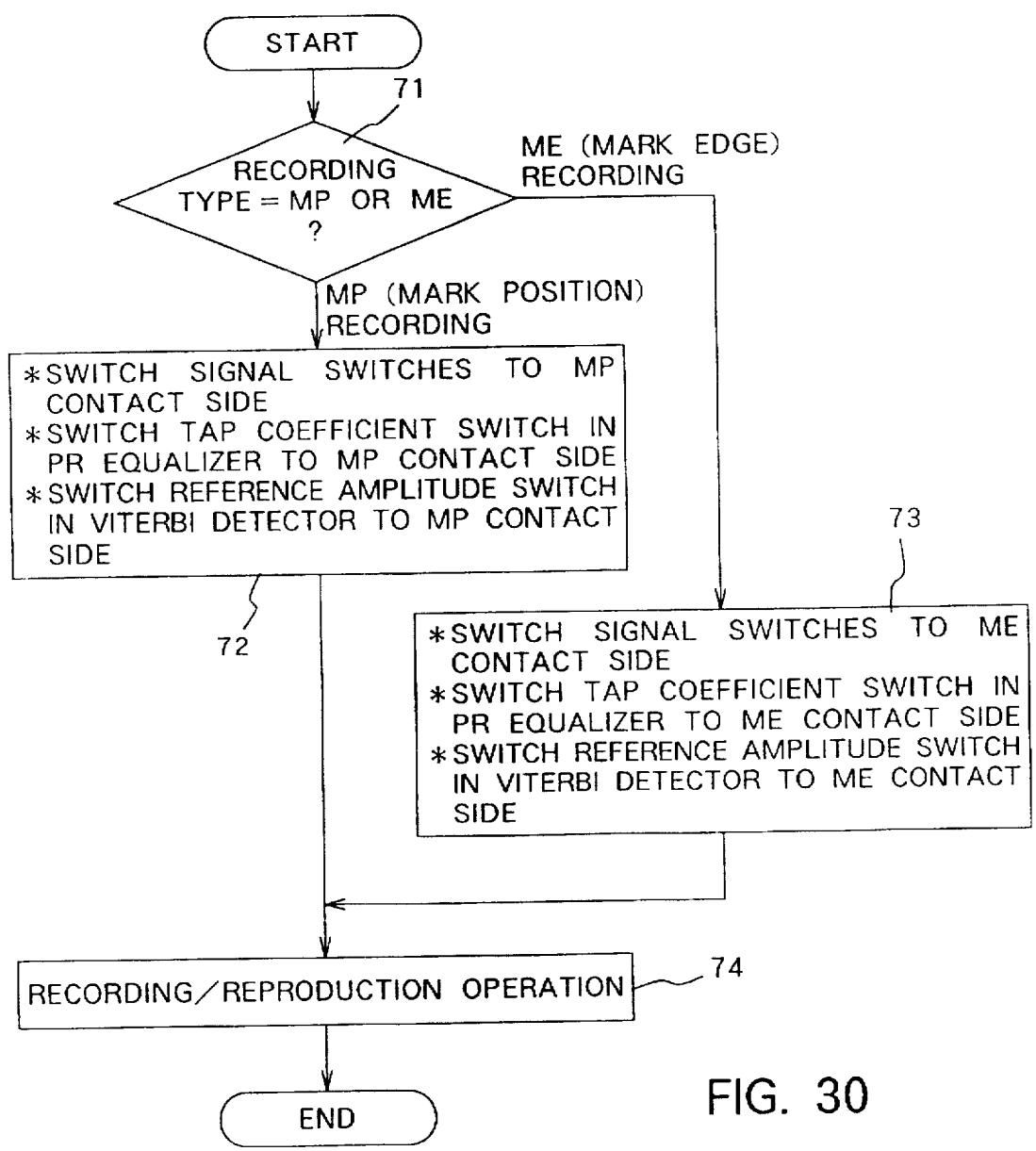
FIG. 30 is a flow chart illustrating switching operations of each signal switch where signals recorded by the MP recording and the ME recording are involved.

Subsequently, a selection operation between the MP recording and the ME recording of the signal processing apparatus of the present embodiment will be described with reference to the flow chart of FIG. 30.

First in step 71, it is discriminated whether the recording type of a disk medium of an object of recording is the MP recording or the ME recording by such a method that an external switch is changed over by an operator of the apparatus or a mark for discrimination of the recording type is provided on a disk medium and is read or some other suitable method. If the recording type is the MP recording, then the control advances to step 72, but if the recording type is the ME recording, then the control advances to step 73. In step 72 (MP recording), the control circuit 20 outputs control signals u(1)=u(2)=u(3)=u(4)=0 to connect the signal switches 2 and 10 (FIG. 22), the tap coefficient switch 29 in the PR equalizer 9 and the reference amplitude switch 45 in the Viterbi detector 14 to the MP contacts 3, 11, 27 and 43, respectively, whereafter the control advances to step 74. On the other hand, in step 73 (ME recording), the control circuit 20 outputs control signals u(1)=u(2)=u(3)=u(4)=1 to connect the signal switches 2 and 10, the tap coefficient switch 29 in the PR equalizer 9 and the reference amplitude switch 45 in the Viterbi detector 14 to the ME contacts 4, 12, 28 and 44, respectively, whereafter the control advances to step 74. In step 74, recording (ME recording or MP recording) of a modulation code sequence onto a recording medium is performed, and recorded pits are reproduced and PRML signal processing is performed.

Figure 14:
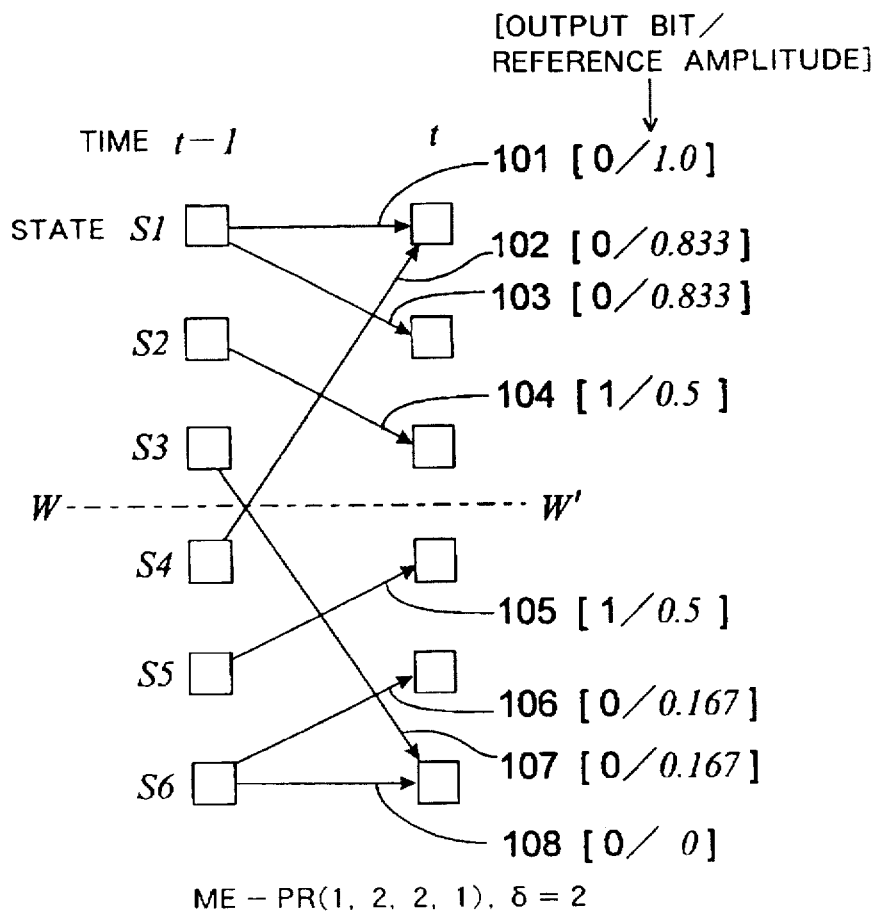
FIG. 14 is a diagrammatic view showing a trellis of a Viterbi detector used for a signal obtained by PR(1,2,2,1) equalization of an ME recorded modulation code sequence wherein the minimum code reversal distance δ is 2.
Figure 15:
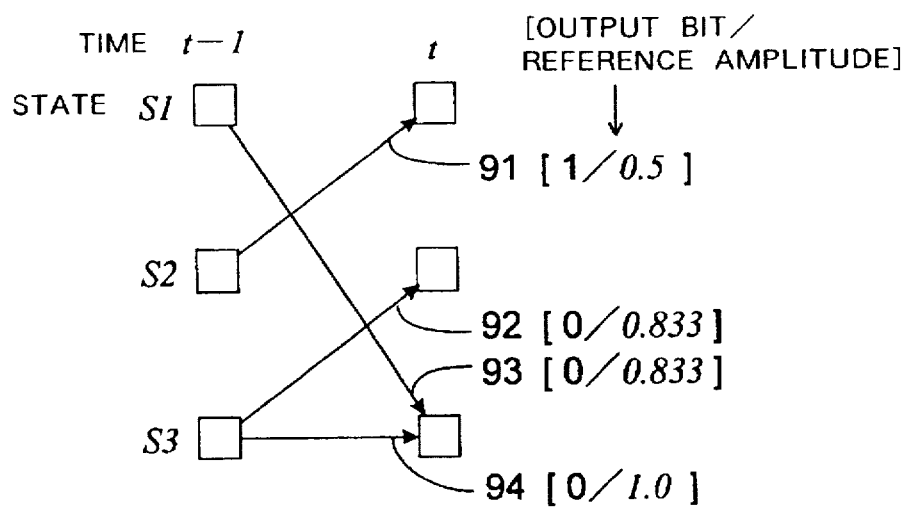
FIG. 15 is a diagrammatic view showing a degeneracy trellis adopted by a Viterbi detector for use with a signal obtained by PR(1,2,2,1) equalization of an ME recorded modulation code sequence wherein the minimum code reversal distance δ is 2.
Figure 16:
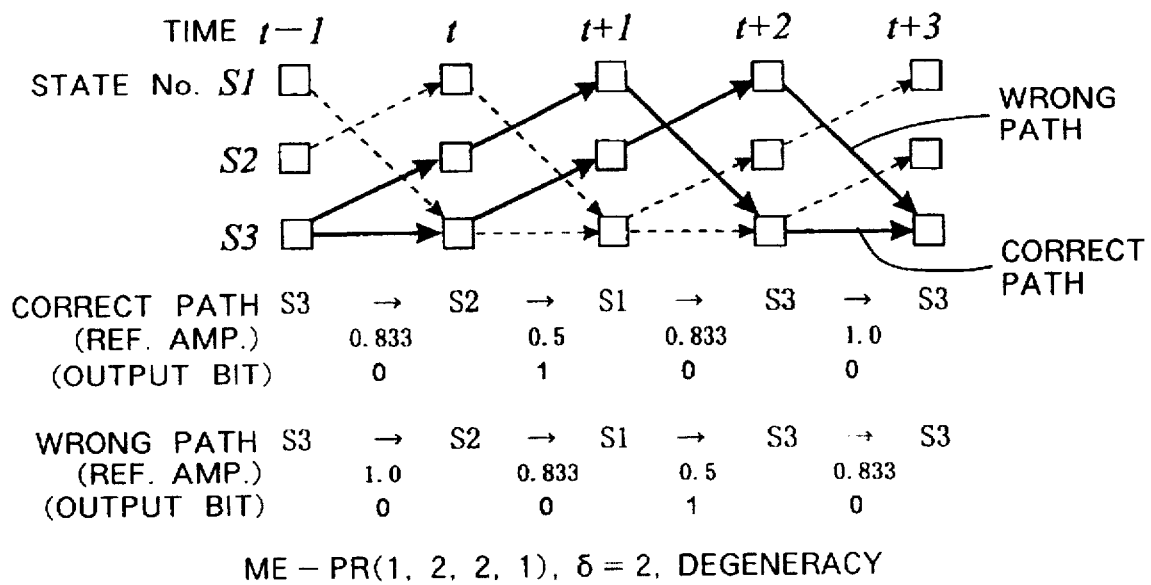
FIG. 16 is a diagrammatic view illustrating a minimum free distance in the degeneracy trellis shown in FIG. 15.
Figure 17:
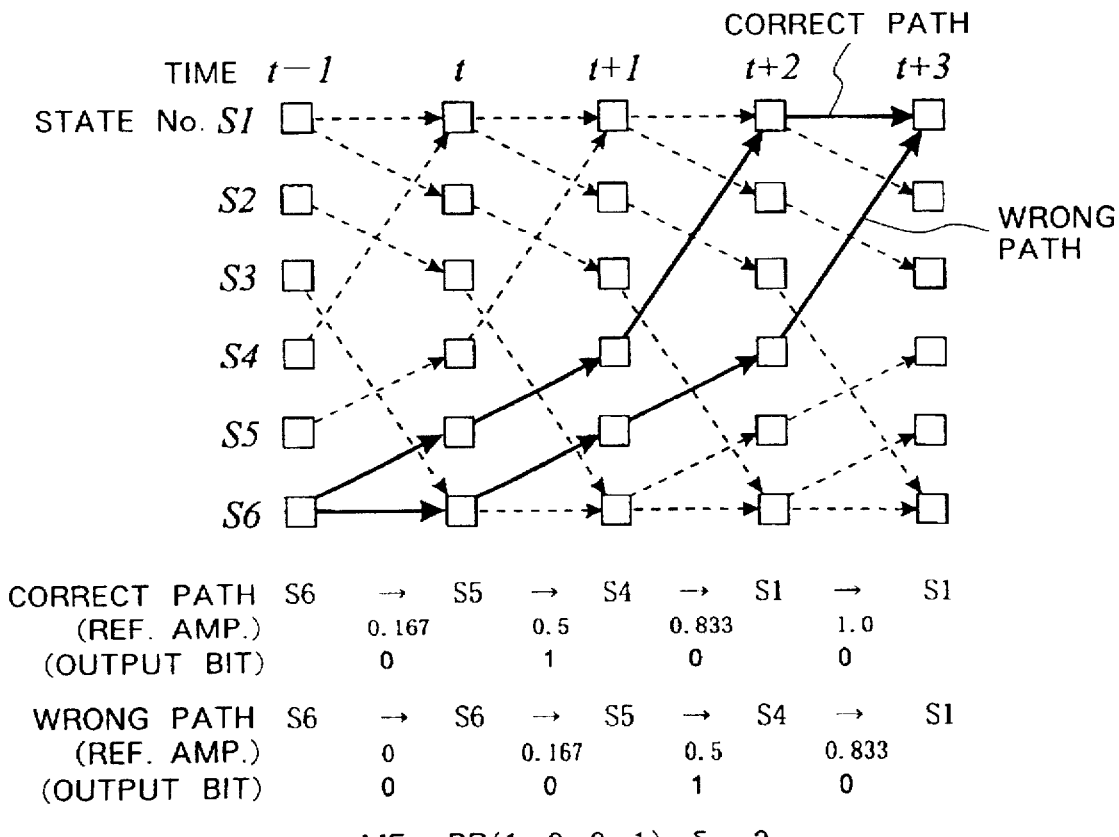
FIG. 17 is a diagrammatic view illustrating a minimum free distance in the trellis shown in FIG. 14.
Figure 18:
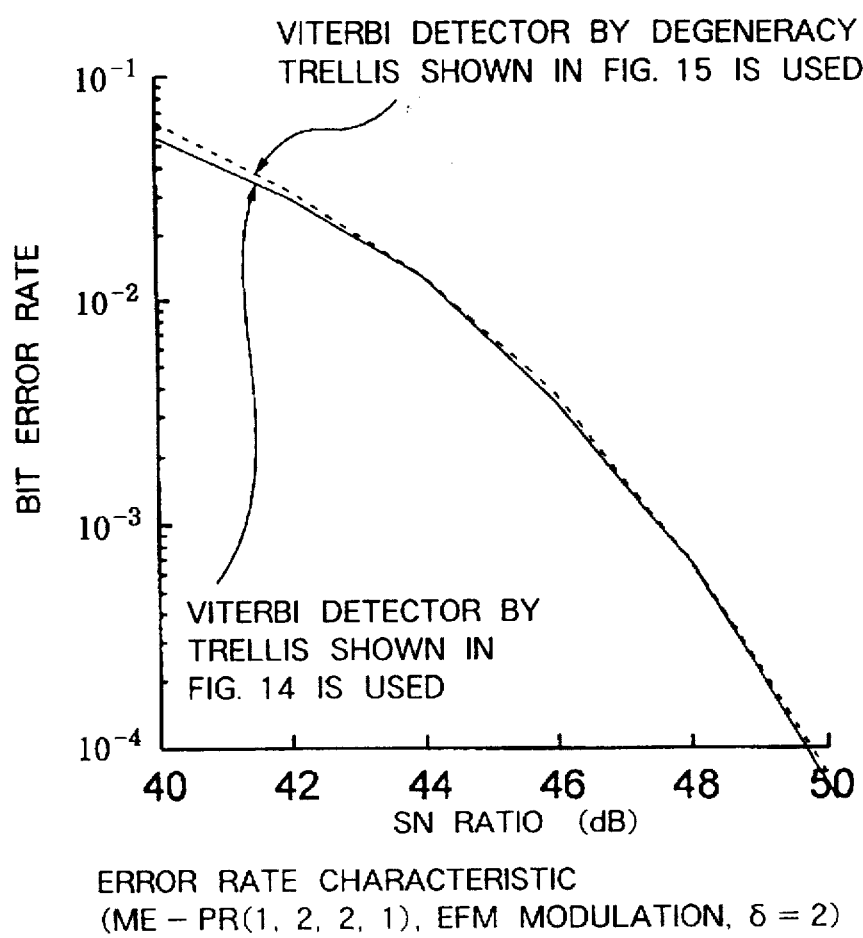
FIG. 18 is a graph showing bit error rate characteristics in a case wherein the degeneracy trellis shown in FIG. 15 is used and another case wherein the trellis of FIG. 14 is used.
Figure 19:
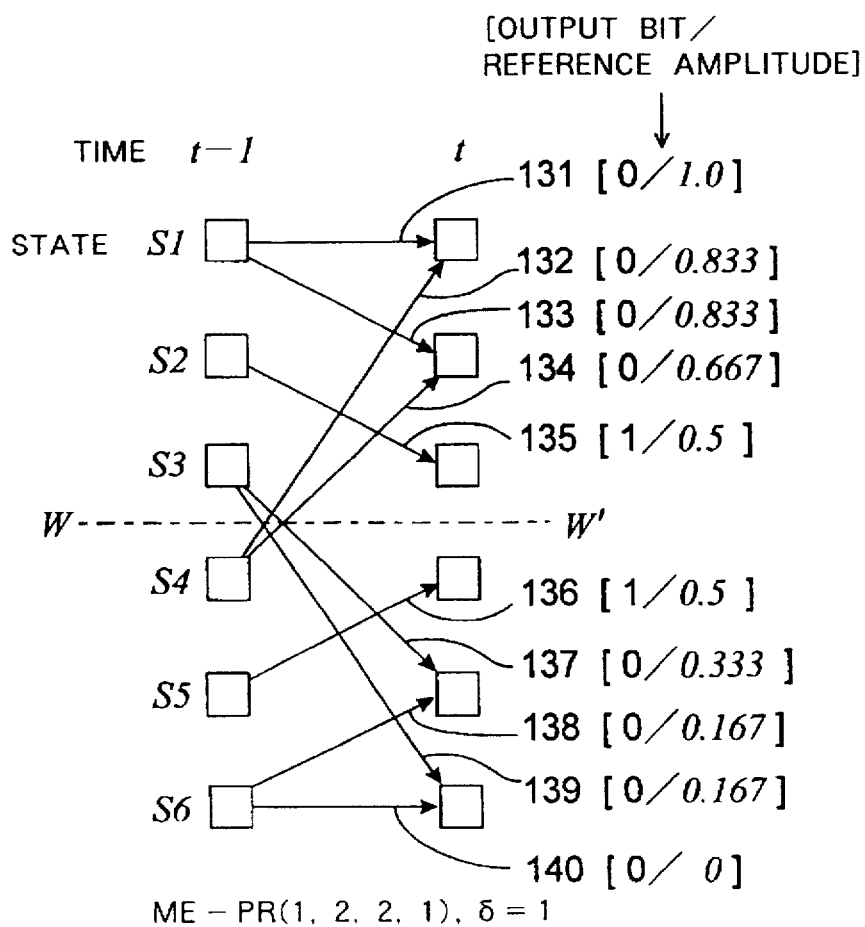
FIG. 19 is a diagrammatic view showing a trellis of a Viterbi detector for use with a signal obtained by PR(1,2,2,1) equalization of an ME recorded modulation code sequence wherein the minimum code reversal distance δ is 1.
Figure 20:
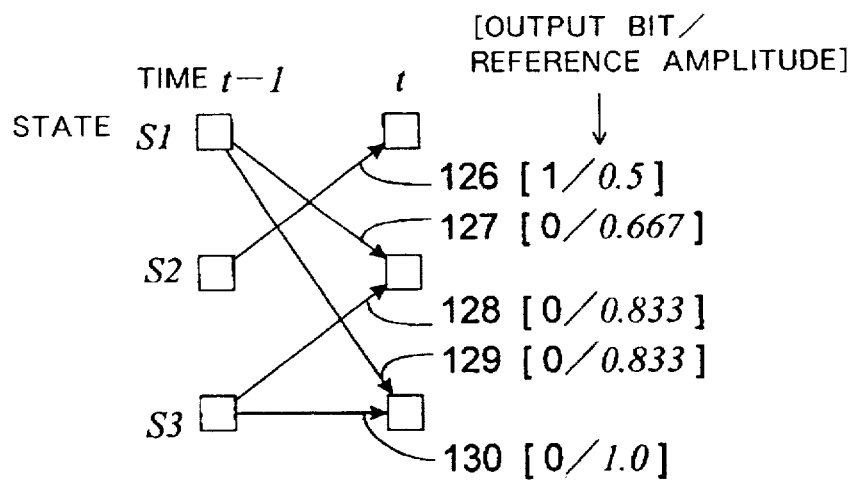
FIG. 20 is a diagrammatic view showing a degeneracy trellis adopted by a Viterbi detector for use with a signal obtained by PR(1,2,2,1) of an ME recorded modulation code sequence wherein the minimum code reversal distance δ is 1.
Figure 21:
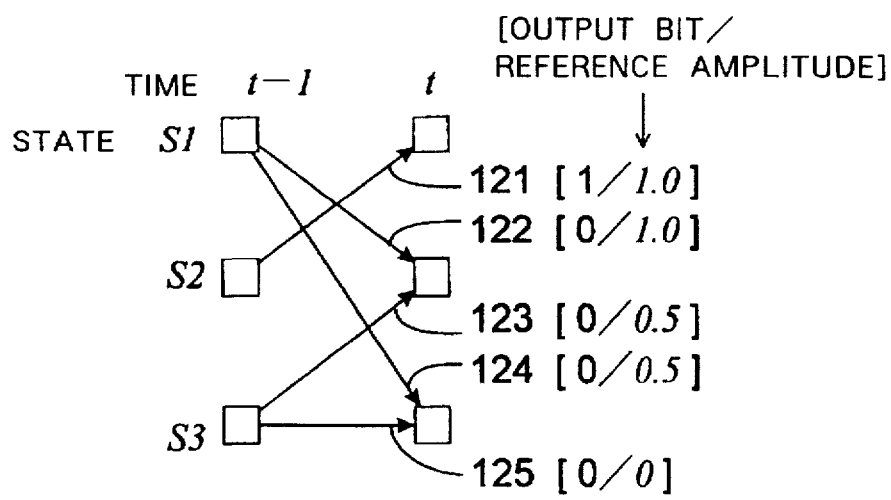
FIG. 21 is a diagrammatic view showing a Viterbi detector for use with a signal obtained by PR(1,2,1) equalization of an MP recorded modulation code sequence wherein the minimum code reversal distance δ is 1.

The signal processing apparatus described above are constructed based on the trellis for MP recording-PR(1,2,1) equalization shown in FIG. 7 and the degeneracy trellis (FIG. 15) obtained by degeneration of the trellis for ME recording-PR(1,2,2,1) equalization shown in FIG. 14 where the minimum code reversal distance $\delta$ is 2. However, the present invention is not limited to the specific case wherein the minimum code reversal distance $\delta$ is 2. In the following, an application of the present invention to a modulation code wherein the minimum code reversal distance $\delta$ is 1 such as a modulation signal by 1–7 modulation will be described in detail with reference to FIGS. 31, 32 and 33. Here, for reproduction of an MP recorded signal, PR(1,2,1) equalization is performed by a PR equalizer and Viterbi detection is performed, but for reproduction of an ME recorded signal, PR(1,2,2,1) equalization is performed and Viterbi detection is performed.

It is assumed that the construction as the entire signal processing apparatus is same as that shown in FIG. 22 and the construction of the PR equalizer in the reproduction signal processing section is same as that shown in FIG. 25. However, to the tap coefficients C1 to Cn and D1 to Dn of the PR equalizer when MP recorded and ME recorded signals are to be reproduced, values suitable for a modulation code wherein the minimum code reversal distance $\delta$ is 1 are set.

Figure 31:
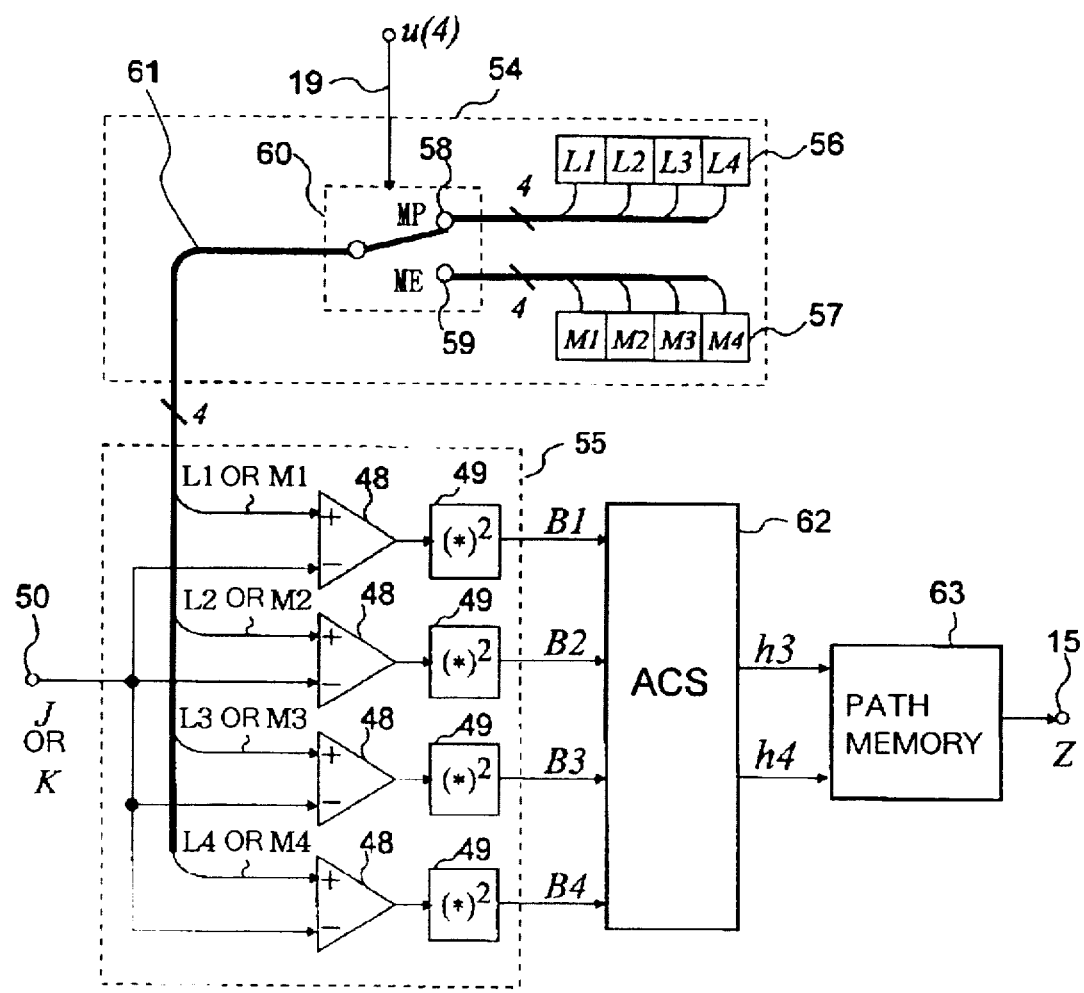
FIG. 31 is a block diagram showing a second example of construction of the Viterbi detector used by the signal processing apparatus of FIG. 22.

FIG. 31 shows an example of construction of a Viterbi detector wherein the minimum code reversal distance $\delta$ is 1. The Viterbi detector shown includes a reference amplitude selection section 54, a branch metric calculation circuit 55, an ACS circuit 62 and a path memory 63.

The reference amplitude selection section 54 includes an MP reference amplitude memory 56 for storing reference amplitudes L1, L2, L3 and L4 for the MP recording, an ME reference amplitude memory 57 for storing reference amplitudes M1, M2, M3 and M4 for the ME recording, and a reference amplitude switch 60 for selecting one of the reference amplitude memories 56 and 57 to select the reference amplitudes of it to the branch metric calculation circuit 55 via a four-parallel reference amplitude transmission line 61. Meanwhile, the branch metric calculation circuit 55 includes four subtractors 48 connected to a Viterbi detector input terminal 50, and four square operators 49 for outputting branch metrics B1, B2, B3 and B4, respectively, to the ACS circuit 62. Each of the square operators 49 squares an output of a corresponding one of the subtractors 48. The ACS circuit 62 outputs path memory control signals h3 and h4 to the path memory 63 based on the branch metrics B1, B2, B3 and B4.

The reference amplitude selection section 54 sets the reference amplitudes L1, L2, L3 and L4 or the reference amplitudes M1, M2, M3 and M4 by the following procedure to the branch metric calculation circuit 55 before a reproduction operation is performed. In the reference amplitude selection section 54, if a reference amplitude switch control signal u(4) on the reference amplitude switch control line 19 is "0", then the reference amplitude switch 60 connects the reference amplitude transmission line 61 to MP contacts 58 so that the reference amplitudes L1, L2, L3 and L4 stored in the MP reference amplitude memory 56 are inputted to the (+) terminals of the four subtractors 48 in the branch metric calculation circuit 55 via the reference amplitude transmission line 61. On the other hand, if the reference amplitude switch control signal u(4) is "1", then the reference amplitude switch 60 connects the reference amplitude transmission line 61 to ME contacts 59 so that the reference amplitudes M1, M2, M3 and M4 stored in the ME reference amplitude memory 57 are inputted to the (+) terminals of the four subtractors 48 via the reference amplitude transmission line 61. Here, it is assumed that, as the reference amplitudes for the MP recording, L1=0, L2=0.5, L3=1.0 and L4=1.0 are stored in the MP reference amplitude memory 56 in advance, and as the reference amplitudes for the ME recording, M1=1.0, M2=0.833, M3=0.667 and M4=0.5 are stored in the ME reference amplitude memory 57 in advance. The reference amplitude values stored in this manner are set to the subtractors 48 in the branch metric calculation circuit 55 in response to the reference amplitude switch control signal u(4).

Since the reference amplitudes are set in this manner, in the MP recording, the branch metric calculation circuit 55 calculates the branch metrics B1 to B4 at each point of time based on $$B1=(0-J)^2, B2=(0.5-J)^2,$$

$$B3=B4=(1.0-J)^2 \tag{14}$$

On the other hand, in the ME recording, the branch metric calculation circuit 55 calculates the branch metrics B1 to B4 based on $$B1=(1.0-J)^2, B2=(0.833-J)^2,$$

$$B3=(0.667-J)^2, B4=(0.5-J)^2 \tag{15}$$

The branch metrics B1 to B4 are outputted simultaneously and independently of each other to the ACS circuit 62.

The ACS circuit 62 holds values P(1) to P(3) called path metrics in the inside thereof. The path metrics P(1) to P(3) are initialized to $$P(1)=P(2)=P(3)=0 \tag{16}$$

before a reproduction operation is performed. Then, upon a reproduction operation, the ACS circuit 62 performs, at each point of time, based on the branch metrics B1, B2, B3 and B4 calculated based on equation (14) or equation (15) and inputted thereto, from P(1) to P(3) obtained by the last point of time and B1, B2, B3 and B4 obtained at the current point of time, comparison between P(1)+B3 and P(3)+B2, comparison between P(1)+B2 and P(3)+B1, and determines the values of the path memory control signals h3 and h4 so that if P(1)+B3<P(3)+B2, then h3=0, if P(1)+B3≧P(3)+B2, then h3=1, if P(1)+B2<P(3)+B1, then h4=0, if P(1)+B2≧P(3)+B1, then h4=1   (17)

may be satisfied. Then, the ACS circuit 62 outputs the thus determined values of the path memory control signals h3 and h4 to the path memory 63. Further, the ACS circuit 62 operates in accordance with

P(1)=P(2)+B4,

P(2)=min{P(1)+B3, P(3)+B2}

P(3)=min{P(1)+B2, P(3)+B1}   (18)

to update the path metrics P(1) to P(3).

In the calculation equations (17) and (18) for addition and comparison given above, for the MP recording, since L3=L4=1.0, B3=B4. Although one of the two branch metrics B3 an B4 is redundant, both of the branch metrics B3 and B4 are intentionally used for the calculation also for the MP recording. Further, where the reference amplitudes for the MP recording are set in the order of L1=0, L2=0.5, L3=1.0 and L4=1.0 mentioned hereinabove, the reference amplitudes for the ME recording are determined as M1=1.0, M2=0.833, M3=0.667 and M4=0.5 as mentioned hereinabove. By adopting the setting method of the reference amplitudes to the reference amplitude memories 56 and 57, whichever one of the MP recording and the ME recording is used, a reproduction signal from the recorded signal can be processed by the operation of the ACS circuit 62 based on the equations (17) and (18). Conventionally, since different operation procedures are provided for the MP recording method and the ME recording method, if the apparatus of the present embodiment is adopted, then it is simplified not only in circuit scale but also in operation procedure from the conventional apparatus.

Figure 32:
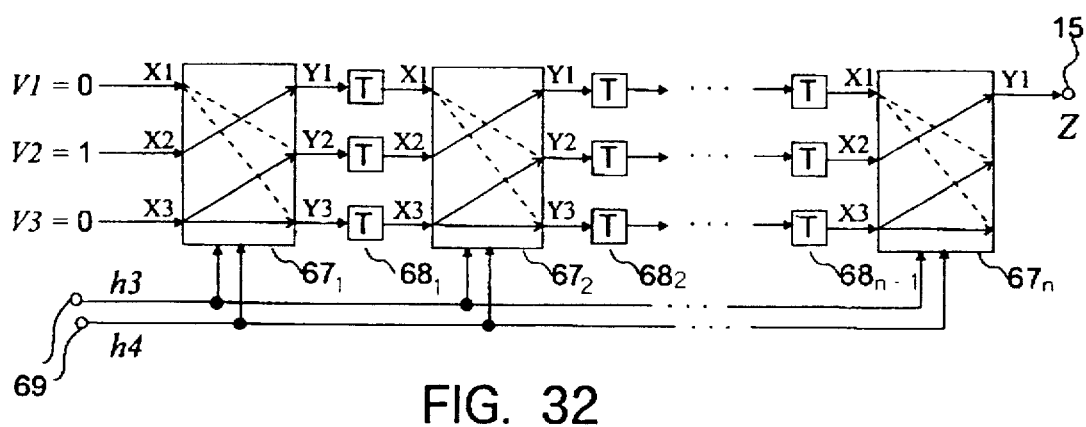
FIG. 32 is a block diagram showing a construction of a path memory used by the Viterbi detector of the second example of construction.
Figure 33A:
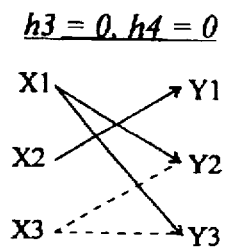
FIGS. 33A, 33B, 33C and 33D are diagrammatic views illustrating a relationship between values of path memory control signals to the path memory shown in FIG. 32 and an internal connection condition of a detection sequence switch.
Figure 33B:
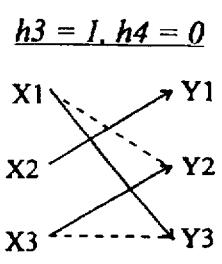
Figure 33C:
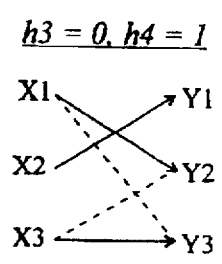
Figure 33D:
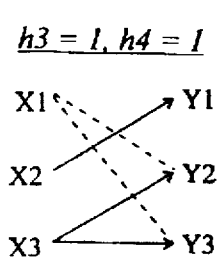

FIG. 32 shows an example of construction of the path memory 63. The path memory 63 shown receives, at each point of time, path memory control signals h3 and h4 from the ACS circuit 62 via a path memory control signal input terminal 69 as described hereinabove. Further, the path memory 63 includes n detection sequence switches $67_1$ to $67_n$, and 3(n-1) delay elements $68_1$ to $68_{n-1}$. Every three delay elements $68_1$ to $68_{n-1}$ constitute respective sets and the sets of three delay elements interposed between individual adjacent ones of the detection sequence switches $67_1$ to $67_n$. Each of the delay elements $68_1$ to $68_n$ outputs an input thereto after delaying it by one unit time. The path memory control signals (detection sequence switch control signals) h3 and h4 are supplied to the detection sequence switches $67_1$ to $67_n$. In the path memory, at each point of time at which one bit is to be processed, input terminals and output terminals of each of the detection sequence switches $67_1$ to $67_n$ are connected in such a manner as shown in FIG. 30A, 30B, 30C or 30D depending upon whether the values of the path memory control signals h3 and h4 are (h3, h4)=(0, 0), (1, 0), (0, 1) or (1, 1). Then, all of values of the delay elements $68_1$ to $68_{n-1}$ connected to the output terminals of the detection sequence switches $67_1$ to $67_{n-1}$ are shifted in the rightward direction toward the next delay elements via respective detection sequence switches. Simultaneously, V1=0, V2=1 and V3=0 which are candidates for Viterbi detector output sequence digit are inputted from input terminals X1 to X3, respectively. Consequently, a Viterbi detector output signal Z for one point of time is outputted from the Viterbi detector output terminal 15, and the input bits V1 to V3 are inputted to the three delay elements $68_1$ via the detection sequence switch $67_1$ and the output terminals Y1, Y2 and Y3 of the detection sequence switch $67_1$. By performing the procedure described above at each point of time, a Viterbi detector output signal Z composed of binary symbols {0, 1} is obtained from the Viterbi detector output terminal 15. The number n of the detection sequence switches is sufficient if it is several tens or more.

As described above, in the present embodiment, the PR equalizer is constructed such that tap coefficients suitable for recording signals for the MP recording and the ME recording are prepared and switched so that they can be selectively set to the PR equalizer, and the Viterbi detector is constructed such that different reference amplitudes are prepared for the MP recording and the ME recording and are switched so that they are selectively used as reference amplitudes. Then, making use of the fact that the structure of a degeneracy trellis from a conventional trellis used for an ME recorded signal coincides with the structure of a trellis for an MP recorded signal, whichever one of recorded signals recorded by the MP recording and the ME recording should be reproduced, Viterbi detection can be performed using the single path memory. As a result, the signal processing apparatus of the present embodiment can perform PRML signal processing of a signal reproduced from any of a recording medium recorded by the MP recording and another recording medium recorded by the ME recording only by means of the reproduction signal processing circuit which includes a single PR equalizer and a single Viterbi detector. In other words, the necessity for preparation of two different reproduction signal processing circuits for the MP recording and the ME recording is eliminated. Further, for reproduction signals from both of a recording medium recorded by the MP recording and another recording medium recorded by the ME recording, PRML signal processing can be performed only by one kind of circuit operation procedure. This is because the storage order of reference amplitudes into the reference amplitude memory is determined so that operation of the ACS (add, compare and select) circuit in the MP recording and Viterbi detector can be performed without taking a difference in reference amplitude between the MP recording and the ME recording into consideration.

While a preferred embodiment of the present invention has been described using specific terms, such description is for illustrative purposes only, and it is to be understood that changes and variations may be made without departing from the spirit or scope of the following claims.

What is claimed is:

1. A signal processing apparatus which performs PRML (Partial Response Maximum Likelihood) signal processing for a reproduction signal from a recording medium, comprising an equalizer to which the reproduction signal is inputted and which equalizes the reproduction signal with equalizer transfer characteristics, the equalizer transfer characteristics being settable;

a first memory storing the equalizer transfer characteristics for MP (mark position) recording;

a second memory storing the equalizer transfer characteristics for ME (mark edge) recording;

a folded back value calculation circuit for folding back an input signal thereto with reference to a predetermined level to output a folded back calculation circuit output signal corresponding to an absolute value of a difference between the predetermined level and the input signal;

a Viterbi detector having a path memory and performing a Viterbi detection with reference amplitudes, the reference amplitude being settable;

29 a third memory storing the reference amplitudes for the MP recording; and a fourth memory storing the reference amplitudes for the ME recording;

said path memory being constructed based on a structure of a trellis for a signal recorded by the MP recording; wherein when the reproduction signal based on the MP recording is reproduced, the equalizer transfer characteristics for the MP recording are set to the equalizer, the reference amplitude for the MP recording are set to the Viterbi detector, and the output of the equalizer is directly supplied to the Viterbi detector, and when the reproduction signal based on the ME recording is reproduced, the equalizer transfer characteristics for the ME recording are set to the equalizer, the reference amplitude for the ME recording are set to the Viterbi detector, and the output of the equalizer is supplied to the Viterbi detector via the folded back value calculation circuit.

2. The signal processing apparatus according to claim 1, wherein the equalizer is a partial response (PR) equalizer and the equalizer transfer characteristics for a reproduction signal from a signal recorded by the MP recording are represented by PR(1,2,1), and the equalizer transfer characteristics for a reproduction signal from a signal recorded by the ME recording are represented by PR(1,2,2,1).

3. The signal processing apparatus according to claim 1, wherein the predetermined level is 0.5 in an relative level.

4. A signal processing apparatus which performs PRML (Partial Response Maximum Likelihood) signal processing for a reproduction signal from a recording medium, comprising an equalizer to which the reproduction signal is inputted and to equalize the reproduction signal with equalizer transfer characteristics;

transfer characteristic storage means for storing the equalizer transfer characteristics individually for MP (mark position) recording and ME (mark edge) recording;

first selection means for selecting the equalizer transfer characteristics from said transfer characteristic storage means depending upon whether the recording type on the recording medium is the MP recording or the ME recording and setting the selected equalizer transfer characteristics to said equalizer;

a folded back value calculation circuit for folding back an input signal thereto with reference to a predetermined level to output a folded back calculation circuit output signal corresponding to an absolute value of a difference between the predetermined level and the input signal;

a Viterbi detector having a path memory and performing a Viterbi detection with reference amplitudes;

reference amplitude storage means for storing the reference amplitudes for the MP recording and the ME recording;

30 second selection means for selecting the reference amplitudes from said reference amplitude storage means depending upon whether the recording type on the recording medium is the MP recording or the ME recording and setting the selected reference amplitudes to said Viterbi detector; and third selection means for inputting, when the recording type on the recording medium is the MP recording, an output of said equalizer to said Viterbi detector, but inputting, when the recording type on the recording medium is the ME recording, the output of said equalizer to said Viterbi detector via said folded back value calculation circuit;

said path memory being constructed based on a structure of a trellis for a signal recorded by the MP recording, said path memory being used upon reproduction of a recorded signal irrespective of whether the recorded signal is a signal recorded by the MP recording or a signal recorded by the ME recording.

5. The signal processing apparatus according to claim 4, further comprising a recording signal processing section for producing a signal corresponding to a recorded mark train to be formed on the recording medium in response to a modulation code sequence, said recording signal processing section including an NRZI (Non Return to Zero Inversion) circuit for performing NRZI conversion for an input signal thereto, and fourth selection means for using, when the MP recording onto the recording medium is to be performed, the modulation code sequence as it is as a signal corresponding to the recording mark train, but using, when the ME recording onto the recording medium is to be performed, a signal obtained by inputting the modulation code sequence to said NRZI circuit as a signal corresponding to the recording mark train.

6. The signal processing apparatus according to claim 4, wherein the equalizer is a partial response (PR) equalizer and the equalizer transfer characteristics for a reproduction signal from a signal recorded by the MP recording are represented by PR(1,2,1), and the equalizer transfer characteristics for a reproduction signal from a signal recorded by the ME recording are represented by PR(1,2,2,1).

7. The signal processing apparatus according to claim 4, wherein the predetermined level is 0.5 in an relative level.

8. The signal processing apparatus according to claim 5, wherein the equalizer is a partial response (PR) equalizer and the equalizer transfer characteristics for a reproduction signal from a signal recorded by the MP recording are represented by PR(1,2,1), and the equalizer transfer characteristics for a reproduction signal from a signal recorded by the ME recording are represented by PR(1,2,2,1).

9. The signal processing apparatus according to claim 5, wherein the predetermined level is 0.5 in an relative level.

* * * * *